US 8,308,848 B1
Nov. 13, 2012

(12) United States Patent
Alptekin et al.

(54) HIGH TEMPERATURE GAS DESULFURIZATION SORBENTS

(75) Inventors: Gokhan Alptekin, Boulder, CO (US);
Margarita DuBovik, Denver, CO (US);
Ambalavanan Jayaraman, Nothglenn, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 319 days.

(21) Appl. No.: 12/626,870

(22) Filed: Nov. 27, 2009

(51) Int. Cl.
*B01D 53/48* (2006.01)
*B01J 20/02* (2006.01)

(52) U.S. Cl. ......... 95/136; 95/900; 96/154; 423/244.02; 423/244.06; 429/411

(58) Field of Classification Search ............ 95/135–137, 95/900; 96/153, 154; 423/242.1, 244.01, 423/244.02, 244.04, 244.06; 502/325, 328, 502/400; 429/410, 411
See application file for complete search history.

(56) References Cited

U.S. PATENT DOCUMENTS

| | | | | |
|---|---|---|---|---|
| 3,888,970 A | * | 6/1975 | Haas et al. | 423/244.04 |
| 3,974,256 A | * | 8/1976 | Wheelock et al. | 423/230 |
| 4,425,312 A | | 1/1984 | Brignac | |
| 4,449,991 A | * | 5/1984 | Brannon et al. | 95/136 |
| 4,490,480 A | | 12/1984 | Lok et al. | |
| 4,690,806 A | | 9/1987 | Schorfheide | |
| 5,693,588 A | | 12/1997 | Poston | |
| 5,938,800 A | | 8/1999 | Verrill et al. | |
| 6,113,873 A | * | 9/2000 | Tunashima et al. | 423/608 |
| 6,673,743 B2 | | 1/2004 | Lok | |
| 7,309,416 B2 | | 12/2007 | Fokema et al. | |
| 7,566,393 B2 | | 7/2009 | Klabunde et al. | |
| 2003/0102255 A1 | | 6/2003 | Mahajan | |
| 2003/0113598 A1 | * | 6/2003 | Chow et al. | 429/17 |
| 2004/0035055 A1 | | 2/2004 | Zhu et al. | |
| 2004/0091753 A1 | * | 5/2004 | Terorde et al. | 429/12 |
| 2005/0121365 A1 | * | 6/2005 | Weston et al. | 208/226 |
| 2007/0092766 A1 | | 4/2007 | England et al. | |
| 2008/0267848 A1 | | 10/2008 | Stephanopoulos et al. | |
| 2008/0268312 A1 | * | 10/2008 | Lee et al. | 429/26 |

(Continued)

FOREIGN PATENT DOCUMENTS

EP 0239687 10/1987

(Continued)

OTHER PUBLICATIONS

Akinc et al. (1998) "Synthesis of nickel hydroxide powders by urea decomposition," *J. European Ceramic Soc.* 18(11):1559-1564.

(Continued)

*Primary Examiner* — Frank Lawrence, Jr.
(74) *Attorney, Agent, or Firm* — Greenlee Sullivan P.C.

(57) ABSTRACT

Gas desulfurization sorbents and methods using them for removal of sulfur from gas streams, particularly at high temperatures ranging from 500 to 1000° C. The sorbents and methods are of particular application to produce a sulfur-clean feed from reformate gas generated from readily available transportation fuels containing sulfur. Sorbents of the invention can reduce the sulfur concentration in reformate gas to parts per billion on volume basis (ppbv) levels over a large range of temperatures. Sorbent materials of this invention comprise a nickel phase dispersed on a particulate support or a monolith support. The support can be a high surface area support with surface area of 100 m²/g or higher. The invention also provides systems for desulfurizing reformate gas and systems for providing a desulfurized gas to a fuel cell, particularly a solid oxide fuel cell.

33 Claims, 11 Drawing Sheets

U.S. PATENT DOCUMENTS

| | | | |
|---|---|---|---|
| 2008/0292923 | A1 | 11/2008 | Ballard et al. |
| 2008/0305025 | A1 | 12/2008 | Vitner et al. |
| 2009/0114093 | A1* | 5/2009 | Li et al. ........................ 95/135 |

FOREIGN PATENT DOCUMENTS

| | | |
|---|---|---|
| WO | WO2006052997 | 5/2006 |
| WO | WO2007074437 | 7/2007 |
| WO | WO2008043060 | 4/2008 |

OTHER PUBLICATIONS

Alonso et al. (2001) "The Performance of Some ZnO-Based Regenerable Sorbents in Hot Coal Gas Desulfurization Long-Term Tests Using Graphite as a Pore-Modifier Additive," *Energy Fuels* 15(6):1396-1402.

Alonso et al. (2000) "Characterization of Mn and Cu oxides as regenerable sorbents for hot coal gas desulfurization," *Fuel Proc. Tech.* 62(1):31-44.

Babich et al. (2003) "Science and technology of novel processes for deep desulfurization of oil refinery streams: a review," *Fuel* 82(6):607-631.

Bakker et al. (2003) "A high capacity manganese-based sorbent for regenerative high temperature desulfurization with direct sulfur production Conceptual process application to coal gas cleaning," *Chemical Engineering Journal* 96:223-235.

Ben-Slimane et al. (1994) "Desulfurization of Hot Coal-Derived Fuel Gases with Manganese-Based Regenerable Sorbents. 1. Loading (Sulfidation) Tests," *Energy & Fuels* 8(6):1175-1183.

Ben-Slimane et al. (1994) "Desulfurization of Hot Coal-Derived Fuel Gases with Manganese-Based Regenerable Sorbents. 2. Regeneration and Multicycle Tests," *Energy & Fuels*, 8(6):1184-1191.

Bergamaschi et al. (2008) "Hydrogen Production by Ethanol Steam Reforming Over Cu and Ni Catalysts Supported on ZrO2 and Al2O3 Microspheres," *Mater. Sci. Forum* 591-593:734-739.

De Wild et al. (2002) "Removal of Sulphur-Containing Odorants from Natural Gas for PEMFC-Based Micro-Combined Heat and Power Applications," Paper presented at the Fuel cell Seminar 2002, Palm Springs, CA, Nov. 18-21, pp. 227-230.

Fujisaki et al. (2007) "Nanostructural Characterization of Hydrothermally Stable γ-Alumina-Based Composite Materials by Transmission Electron Microscopy," *Adv. Mater. Res.* 26-28:1109-1112.

Gribble et al. (2009) "Perovskite sorbents for warm-gas removal of sulfur," 26th Annual Int. Pittsburgh Coal Conf., Pittsburgh, PA, Sep. 20-23, 16pp.

Herna'ndez-Maldonado et al. (Web Release Dec. 2, 2002) "Desulfurization of Liquid Fuels by Adsorption via p-Complexation with Cu(I)-Y and Ag-Y Zeolites," *Ind. Eng. Chem. Res.* 42:123-129.

Jayalakshmi et al. (2005) "Optimum conditions to prepare high yield, phase pure α-Ni(OH)2 nanoparticles by urea hydrolysis and electrochemical ageing in alkali solutions," *J. Power Sources* 150:272-275.

Jung et al. (2006) "H2S removal and regeneration properties of Zn—Al-based sorbents promoted with various promoters," *Catal. Today* 111(3-4):217-222.

Jung et al. (2008) "The simultaneous removal of hydrogen sulfide and ammonia over zinc-based dry sorbent supported on alumina," *Separation Purif. Technol.* 63(2):297-302.

Li et al. (Web Release Oct. 2, 2007) "Preparation of Nano-NiO Particles and Evaluation of Their Catalytic Activity in Pyrolyzing Biomass Components" *Energy & Fuels* 22:16-23.

Liang et al. (1999) "Effect of manganese content on the properties of high temperature regenerative H2S acceptor," *Fuel* 78:319-325.

Liang et al. (Web Release Feb. 25, 2004) "β-Nickel Hydroxide Nanosheets and Their Thermal Decomposition to Nickel Oxide Nanosheets," *J. Phys. Chem. B* 108:3488-3491.

Ma et al. (2002) "A New Approach to Deep Desulfurization of Gasoline, Diesel Fuel and Jet Fuel by Selective Adsorption for Ultra-Clean Fuels and for Fuel Cell Applications," *Catal. Today* 77:107-116.

Mavis et al. (2004) "Three-component layer double hydroxides by urea precipitation: structural stability and electrochemistry,"*J. Power Sources* 134:308-317.

Siriwardane et al. (Web Release Mar. 1, 2000) "Spectroscopic Characterization of Nickel Containing Desulfurization Sorbents," *Ind. Eng. Chem. Res.* 39:1106-1110.

Soler-Illia et al. (Web Release Oct. 15, 1999) "Synthesis of Nickel Hydroxide by Homogeneous Alkalinization. Precipitation Mechanism," *Chem. Mater.* 11(11):3140-3146.

Song et al. (2002) "A new approach to deep desulfurization of gasoline, diesel fuel and jet fuel by selective adsorption for ultra-clean fuels and for fuel cell applications," *Catalysis Today* 77:107-116.

Song, C. (2003) "An overview of new approaches to deep desulfurization for ultra-clean gasoline, diesel fuel and jet fuel," *Catalysis Today* 86:211-263.

Song et al. (2003) "New Design Approaches to Ultra-Clean Diesel Fuels by deep Desulfurization and Deep Dearomatization," *Appl. Catal B. Environ.* 41:207-238.

Wang et al. (Web Release Jun. 16, 2005) "Cerium Oxide-Based Sorbents for Regenerative Hot Reformate Gas Desulfurization," *Energy & Fuels* 19:2089-2097.

Yoon et al. (2003) "A kinetic study on medium temperature desulfurization using a natural manganese ore," *Chemical Eng. Sci.* 58:2079-2087.

\* cited by examiner

HIGH TEMPERATURE GAS DESULFURIZATION SORBENTS

This invention was made with United States Government support under Government Contract W56 HZV-05-C-0634. The United States government has certain rights to this invention.

BACKGROUND OF THE INVENTION

The major drawback to the use of fuel cells as electric generators and auxiliary power units (APUs) in commercial and passenger vehicles is their inability to directly use readily available transportation fuels. Gasoline, diesel or jet fuels are ideal for fuel cells because of their high energy density, ready availability, safety and ease of storage. These fuels must be converted to a synthesis gas feed using a reformer (e.g., steam reformer, partial oxidizer, or catalytic partial oxidizer) for use in fuel cells. In addition, all fuel cells require an essentially sulfur-free feed stream in order to prevent poisoning of fuel cell anode catalyst, which requires effective desulfurization of either the liquid fuel or the synthesis gas feed. Even the more robust high temperature solid oxide fuel cells (SOFCs) are poisoned with low levels of sulfur contaminants. Although the U.S. Environmental Protection Agency (EPA) has new regulations in place that mandate refineries to reduce sulfur levels of transportation fuels down to 30 parts per million on weight basis (ppmw) in gasoline and 15 ppmw in road diesel; even with meeting these reduction levels, sulfur concentrations in transportation fuels will still exceed the levels tolerable by state of the art SOFCs, about 100 parts per billion on volume basis (ppbv), preferably 10 ppbv or less. In the reforming step, the organic sulfur species in the fuel (e.g., ranging from thiols to dimethyldibenzothiopehenes) are converted mainly to hydrogen sulfide ($H_2S$) and carbonyl sulfide (COS), and contaminate the reformate gas stream. Even when using Ultra Low Sulfur Diesel (ULSD) fuel and with the dilution in the fuel reformer (due to the air intake, addition of steam or anode tail gas recycle), the reformate gas contains more than 3 parts per million on volume basis (ppmv) sulfur which is well beyond the desired range of the state-of-the-art fuel cells. Similar to the transportation fuels, the sulfur in other hydrocarbon feeds, such as natural gas and liquefied petroleum gas suitable for stationary applications also must be reduced to low levels (because natural gas is colorless, odorless, and tasteless, sulfur-bearing odorants such as mercaptans or dimethyl sulfidorganic is added before distribution to give it a distinct odor that serves as a safety device by allowing it to be detected in case of a leak. In being reformed these organic sulfur compounds also produce $H_2S$).

While sorbent technologies are currently available for removing sulfur from reformate gas, they are not suitable for use at the very high temperature needed for feed gas to SOFCs (greater than 500° C. and typically 700-800° C.). The currently available sorbents exhibit higher sulfur capacity, removal rate and stability at more moderate temperatures below about 500° C. For example, most conventional post-reformate treatment systems use a metal oxide sorbent (e.g., zinc oxide and its derivatives) that covalently binds sulfur. While, such sorbents can be effectively used up to 500° C., sulfur slippage from these sorbents increases significantly in the 700-800° C. range allowing sulfur concentration in the feed gas which well exceed the levels tolerable by the fuel cells. For example, the equilibrium $H_2S$ concentration over the ZnO sorbent is calculated as 5.6 ppmv and 15.7 ppmv at 700 and 800° C., respectively, using a gas composition representative of hot reformate gas. Therefore, conventional metal oxide sorbents will only be useful in such applications, if the temperature of reformate gas is reduced to 500° C. or less to carry out the desulfurization. For SOFC systems, after removal of sulfur, the desulfurized gas must be reheated before being introduced into the fuel cell (typically operating at 700-800° C.). The added steps of reformate gas cooling and re-heating reduce the overall energy conversion efficiency and require the use of expensive heat exchangers, which increases system cost, volume and complexity.

A number of sorbents for sulfur removal are known in the art. For example, D. A. Gribble, S. A. Rolfe and M. V. Mundschau (2009) International Pittsburgh Coal Conference provide a review of perovskite sorbents for warm-gas removal of sulfur. Song, Chunshan (2003) An overview of new approaches to deep desulfurization for ultra-clean gasoline, diesel fuel and jet fuel, Catalysis Today 86:211-263 provides a review of materials for desulfurization. at lower temperatures.

Wang, Z., Flytzani-Stephanopoulos, M. "Cerium Oxide-Based Sorbents for Regenerative Hot Reformate Gas Desulfurization" (2005) Energy & Fuels, 19: 2089-2097 reports cerium oxide based sorbents for regenerative hot reformate Gas Desulfurization. More specifically the reference relates to lanthanum- or copper-containing cerium oxide sorbents for desulfurization of simulated reformate at 650 and 800° C. US published patent application 20080267848, published Oct. 30, 2008 reports an apparatus and methods for non-regenerative and regenerative hot gas sulfurization using a doped cerium oxide sorbent.

A number of references relate to the use of manganese ore and related species as sorbents for high temperature desulfurization. Bakker, J. W., Kapteijn, H., Moulijn, J. A., "A high capacity manganese-based sorbent for regenerative high temperature desulfurization with direct sulfur production: Conceptual process application to coal gas cleaning," Chemical Engineering Journal, 96, (2003) 223-235 reports bulk removal of sulfur from dry coal gas at temperatures ranging from 400 to 1000° C., with optimum capacity reported at 827 to 927° C. using a sorbent described as crystalline $MnAl_2O_4$, with a small amount of disperse MnO and an amorphous Mn—Al—O phase. Sulfur reduction from 1% $H_2S$ to less than the detection limit of 5 ppm was reported. Ben-Slimane, R., Hepworth, M. T., "Desulfurization of Hot Coal-Derived Fuel Gases with Manganese-Based Regenerable Sorbents. 1. Loading (Sulfidation) Tests," Energy & Fuels, 8, (1994a) 1175-1183 and Ben-Slimane, R., Hepworth, M. T., "Desulfurization of Hot Coal-Derived Fuel Gases with Manganese-Based Regenerable Sorbents. 2. Regeneration and Multicycle Tests," Energy & Fuels, 8, (1994b) 1184-1191 report sulfur sorbents based on manganese ore and more specifically a combination of manganese carbonate, alundum, and bentonite, or a combination of manganese ore, alundum and dextrin for hot fuel gases at temperatures ranging from 750 to 1000° C. Certain sorbents are said to be highly-effective, inexpensive, and regenerable. Yoon, Y., Kim, M. W., Yoon, Y. S., Kim, S. H., "A kinetic study on medium temperature desulfurization using a natural manganese ore," Chemical Eng. Sci., 58, (2003) 2079-2087 reports the use of natural manganese ore at temperatures ranging from 400 to 800° C. for sulfur removal. NiO addition was reported to improve sulfidation capacity.

Liang, B., Korbee, R., Gerritsen, A. W., Van den Bleek, C. M., "Effect of manganese content on the properties of high temperature regenerative $H_2S$ acceptor," Fuel, 78, (1999) 319-325 report $Mn/\gamma-Al_2O_3$ acceptor for high temperature, regenerative $H_2S$ removal was prepared by repeated impregnation. For a sample with a manganese content of 34 wt %, a sulfur capacity of about 22 wt % was reported for sulfidation at 850° C.

L. Alonso, J. M. Palacios, and R. Moliner (2001) The Performance of Some ZnO-Based Regenerable Sorbents in Hot Coal Gas Desulfurization Long-Term Tests Using Graphite as a Pore-Modifier Additive, Energy Fuels 15(6):1396-1402 report ZnO based sorbents for sulfur removal.

Suk Yong Jung, Soo Jae Lee, Tae Jin Lee, Chong Kul Ryu, Jae Chang Kim (2006) H2S removal and regeneration properties of Zn—Al-based sorbents promoted with various promoters, Catal. Today 111 (3-4) 217-222 and Suk Yong Jung, Soo Jae Lee, Jung Je Park, Soo Chool Lee, Hee Kwon Jun, Tae Jin Lee, Chong Kul Ryu, Jae Chang Kim (2008) The simultaneous removal of hydrogen sulfide and ammonia over zinc-based dry sorbent supported on alumina, Separation Purif. Technol. 63:297-302 report certain zinc-based sulfur sorbents and report the use of NiO as a promoter in such sorbents.

Siriwardane, R. V., Todd Gardner, James A. Poston, Jr. and Edward P. Fisher, Spectroscopic Characterization of Nickel Containing Desulfurization sorbents, Ind. Eng. Chem. Res. 39 (2000) 1106-1110 reports tests of sorbent pellets with simulated coal-derived hot fuel gas containing $H_2S$ at 538° C.

In certain embodiments of the invention, the nickel phase is deposited by a method that is believed to generate nickel hydroxide and oxide nanoparticles. The following references relate to generation of nickel hydroxide powders or nanoparticles: Akinc, M., Jongen, N., Lemaître, J., Hofmann, H., "Synthesis of nickel hydroxide powders by urea decomposition," J. European Ceramic Soc., 18, (11), (1998) 1559-1564; Jayalakshmi, M., Venugopal, N., Ramachandra Reddy, B., Mohan Rao, M., "Optimum conditions to prepare high yield, phase pure $\alpha$-Ni(OH)2 nanoparticles by urea hydrolysis and electrochemical ageing in alkali solutions," Journal of Power Sources, 150, (2005) 272-275; Li, J., Yan, R., Xiao, B., Liang, D. T., Lee, D. H., "Preparation of Nano-NiO Particles and Evaluation of Their Catalytic Activity in Pyrolyzing Biomass Components," Energy & Fuels, 22, (2008) 16-23; Soler-Illia, G. J. A. A., Jobbágy, M., Regazzoni, A. E., Blesa, M. A., Argentina, "Synthesis of Nickel Hydroxide by Homogeneous Alkalinization. Precipitation Mechanism," Chem. Mater., 11 (11), (1999) 3140-3146; and Liang, Z. H., Zhu, J. Y., Hu, X. L., "-Nickel Hydroxide Nanosheets and Their Thermal Decomposition to Nickel Oxide Nanosheets," J. Phys. Chem. B, 108, (2004) 3488-3491.

There is a need in the art for sorbents exhibiting high capacity, and efficient sulfur removal to levels preferably down to 10 ppbv or less from reformate gas at temperature greater than 500° C. and preferably at temperatures ranging from 700 to 800° C.

SUMMARY OF THE INVENTION

The present invention relates to gas desulfurization sorbents which can be used to produce a sulfur-clean feed from readily available transportation fuels, as well as other hydrocarbon fuels that can be used in stationary systems (such as natural gas, LPG, alcohols etc.). Regardless of the selected fuel type, sorbents of the invention can reduce the sulfur concentration in reformate gas to ppbv levels over a large range of temperatures from ambient up to 1000° C.

The present invention relates to sorbent materials for chemisorption of sulfur in high temperature gas streams containing mainly hydrogen sulfide ($H_2S$) and carbonyl sulfide (COS). In one embodiment, sorbent materials of this invention comprise a metallic nickel phase dispersed on a metal oxide support specifically on a support having surface area of 10 $m^2/g$ or higher and more specifically on a support having surface area of 100 $m^2/g$ or higher. In preferred embodiments, the support has surface area of 100 $m^2/g$ or greater at temperatures between 700 to 800° C. In preferred embodiments, the support is thermally stable to changes in phase, structure or morphology at the temperatures above 500° C. and preferably at temperatures between 700 to 800° C. In specific embodiments, the support is selected from alumina, titania or zirconia. In more specific embodiments, the support is selected from $\theta$-alumina or $\gamma$-alumina. In additional embodiments, particularly where high temperature gas contains only low levels of water, the support can also be silica.

In specific embodiments, nickel loading on the support ranges from 1 to 50 wt %. More specifically, nickel loading on the support ranges from 5 to 30% wt or 10-30% wt. In a specific embodiment, the metallic nickel is dispersed on the support in the form of particles of average particle size of 50 nm or less or in the form of particles of average particle size of 10 nm or less.

In specific embodiments, the support is a rare earth- (including lanthanum, scandium and yttrium) doped metal oxide, wherein the metal oxide is alumina, titania or zirconia. In a preferred embodiment, the support is a rare earth-doped alumina, particularly a rare earth-doped $\gamma$-alumina. In specific embodiments, the support is alumina doped with one or more of lanthanum (La), yttrium (Y) or scandium (Sc). In more specific embodiments, the support is $\gamma$-alumina doped with La, Y or Sc. In more specific embodiments, the support is doped with from 2 to 35% by weight of the rare earth. In more specific embodiments, the support is La-doped $\gamma$-alumina, where the La is present from 2 to 35% by weight. In additional embodiments, the support is La-doped $\gamma$-alumina having 2-15% by weight La. In specific embodiments, the rare earth-doped $\gamma$-alumina has surface area of 100 $m^2/g$ or more between 700 and 800° C. In other specific embodiments, the La-doped $\gamma$-alumina has surface area of 100 $m^2/g$ or more between 700 and 800° C.

In another embodiment, a stabilizer which is selected from alkali or alkaline-earth metals, manganese or combinations thereof is deposited on the support in addition to nickel metal. In a specific embodiment, the stabilizer is magnesium (Mg). More specifically, 0.5 to 25% by weight magnesium is deposited on the support. In another specific embodiment, the stabilizer is manganese (Mn). More specifically, 0.5 to 25% by weight manganese is deposited on the support. In specific embodiments, the support is alumina with a deposited stabilizer which is selected from alkali or alkaline-earth metals, manganese (Mn) or combinations thereof. In a more specific embodiment, the support is $\gamma$-alumina with a deposited stabilizer which is selected from alkali or alkaline-earth metals, manganese (Mn) or combinations thereof. More specifically, 0.5 to 25% by weight magnesium is deposited on the alumina support. More specifically, 0.5 to 25% by weight manganese is deposited on the support. Preferably the level of stabilizer on the support is 2 to 20% by weight. Preferably the support having deposited stabilizer is $\gamma$-alumina. In another embodiment, the support having deposited stabilizer is rare earth-doped $\gamma$-alumina. More specifically, the support having deposited stabilizer is La-doped $\gamma$-alumina. Yet more specifically, the support having deposited stabilizer is La-doped $\gamma$-alumina where the level of La is 2 to 35 weight % or La-doped $\gamma$-alumina where the level of La is 2 to 15 weight %. In more specific embodiments, the sorbent is a rare earth-doped alumina or a rare earth-doped $\gamma$-alumina upon which stabilizer selected from Mg, Mn or combinations thereof and nickel metal is deposited. More specifically 2 to 20% by weight of Mn or Mg and 5% to 30% of nickel metal is deposited on a rare earth-doped alumina or a rare earth-doped γ-alumina. More specifically, 2 to 20% by weight of Mn or Mg and 5% to 30% of nickel metal is deposited on La-doped γ-alumina. In specific embodiments, the amount of Ni deposited on the support is greater on a weight basis than the amount of stabilizer, particularly greater than the amount of Mg and/or Mn.

In another embodiment, a promoter which is selected from ruthenium (Ru) rhodium (Rh) or palladium (Pd) or combinations thereof is deposited on the support in addition to nickel metal. In a specific embodiment, ruthenium (Ru) is deposited on the metal oxide support. More specifically, 0.1 to 10% by weight ruthenium is deposited on the support. In another specific embodiment, palladium (Pd) is deposited on the support. More specifically, 0.1 to 10% by weight palladium is deposited on the support. In specific embodiments, the support is alumina with deposited promoter. In a more specific embodiment, the support is γ-alumina with deposited promoter. More specifically, 0.25 to 5% by weight of promoter is deposited on γ-alumina. In a more specific embodiment, the support is rare earth-doped γ-alumina with deposited promoter. In a more specific embodiment, the support is La-doped γ-alumina with deposited promoter. In a specific embodiment, the sorbent is γ-alumina or La-doped γ-alumina with deposited nickel metal and a promoter selected from Ru or Pd. In a specific embodiment, the sorbent is γ-alumina or La-doped γ-alumina with deposited nickel metal (5-30% by weight) and a promoter selected from Ru or Pd (0.1 to 10% by weight). In another embodiment, a promoter which is selected from ruthenium (Ru) rhodium (Rh) or palladium (Pd) or combinations thereof is deposited on the support in addition to nickel metal and a stabilizer which is selected from alkai or alkaline-earth metals, manganese (Mn) or combinations thereof. In a specific embodiment, the promoter is Ru, Pd or combinations thereof and the stabilizer is Mg, Mn or combinations thereof. In a specific embodiment, the promoter is Ru, Pd or combinations thereof, the stabilizer is Mg, Mn or combinations thereof and the support is selected from alumina, titania or zirconia. In a specific embodiment, the promoter is Ru, Pd or combinations thereof, the stabilizer is Mg, Mn or combinations thereof and the support is selected from alumina, γ-alumina or La-doped γ-alumina. In a specific embodiment, the sorbent is a metal oxide selected from alumina, titania, or zirconia with Ru, Pd, Mg, Mn or combinations thereof and nickel metal deposited thereon. In a specific embodiment, the sorbent is a high surface area metal oxide selected from alumina, titania, or zirconia with Ru, Pd, Mg, Mn or combinations thereof and nickel metal deposited thereon. In a specific embodiment, the sorbent is alumina, γ-alumina, rare earth-doped γ-alumina or La-doped γ-alumina with Ru, Pd Mg, Mn or combinations thereof and nickel metal deposited thereon. In specific embodiments, the amount of Ni deposited on the support is greater on a weight basis than the amount of promoter, particularly greater than the amount of Ru and/or Pd. In specific embodiments, the amount of Ni deposited on the support is greater on a weight basis than the total amount of stabilizer and promoter, particularly greater than the amount of Mg, Mn, Ru, and/or Pd.

In a specific embodiment, the support material of the sorbent has surface area greater than or equal to 50 m$^2$/g, and in a more specific embodiment, the support material has surface area of greater than or equal to 100 m$^2$/g or 200 m$^2$/g. More specifically, the support is high surface area γ-alumina. In a preferred embodiment, the high surface area support is selected from a rare earth doped metal oxide, particularly La-doped γ-alumina. In specific embodiments, the high-surface area La-doped alumina contains from 2-35 wt % lanthanum.

In another embodiment, the sorbent of this invention is a metal nickel phase deposited on a monolith support material. The monolith support can be an inorganic porous substrate, a metal based substrate or a carbon based substrate. In specific embodiments, the monolith is cordierite, alumina, zirconia toughened alumina, zirconia, mullite ($3Al_2O_3 2SiO_2$ or $2Al_2O_3 SiO_2$) or silicon carbide (SiC). Prior to deposition of the nickel phase, the monolith may be coated with a metal oxide, carbon or polymer coating. In specific embodiments, the monolith is ceramic and is coated at least in part with a metal oxide. In specific embodiments, the metal oxide is selected from alumina, titania or zirconia. In specific embodiments, particularly in applications where only low levels of water are in the gases being treated, the metal oxide is silica. In additionally embodiments, the metal oxide is γ-alumina. In additional embodiments, the metal oxide is a rare earth-doped alumina and more specifically a rare earth-doped γ-alumina. In specific embodiments, the metal oxide is a La-doped γ-alumina. In specific embodiments, the metal oxide is a high surface area metal oxide selected from alumina. In specific embodiments, the monolith is at least in part coated with a support or doped-support as described herein. In specific embodiments, the monolith is at least in part coated with a support upon which one or more stabilizer or promoter is (as described herein) deposited in addition to nickel. In specific embodiments, the monolith is at least in part coated with a support upon which one or more of Ru, Pd, Mn, Mg or Ca is deposited in addition to nickel. In specific embodiments, the level of promoter deposited on the support ranges from 0.5 to 10% by weight. In specific embodiments, the level of stabilizer deposited on the support ranges from 5 to 35% by weight. In all monolith embodiments herein, nickel loading on the support that is coated on the monolith ranges from 5% to 50% by weight of the support. In more specific embodiments, the Ni loading on such monoliths ranges from 5 to 35% by weight and most particularly ranges from 10 to 25% by weight. In specific embodiments, the amount of Ni on the monolith support is greater on a weight basis than the amount of stabilizer or promoter, particularly greater than the amount of Mg and/or Mn and greater than the amount of Ru and/or Pd. In specific embodiments, the amount of Ni on the support is greater on a weight basis than the total amount of stabilizer and promoter, particularly greater than the amount of Mg, Mn, Ru, and/or Pd.

In related embodiments, the sorbent is a monolith impregnated with one or more metal oxides, such as alkali or alkaline earth metal oxides, or manganese oxides with a nickel metal phase deposited there upon. The monolith support can be an inorganic porous substrate, a metal based substrate or a carbon based substrate. In specific embodiments, the monolith is cordierite, alumina, zirconia toughened alumina, zirconia, mullite or silicon carbide. In related embodiments, the sorbent is a monolith impregnated with one or more metal oxide, such as alkali or alkaline earth metal oxide, or manganese oxide and with nickel oxide impregnated therein. In a specific embodiment, the monolith is impregnated with a calcium (Ca) precursor such as calcium nitrate [$Ca(NO_3)_2$] which upon calcinations provides a calcium oxide (CaO) layer. In specific embodiments, the monolith is impregnated with CaO and NiO. In specific embodiments, the loading of metal oxide, other than NiO, by impregnation is 5% to 35%. In specific embodiments, the loading of NiO by impregnation is 5% to 30%. In a more specific embodiment, the monolith is impregnated with 10-20% by weight Ca and 10 to 30% by weight Ni. In more specific embodiments, the Ni loading by deposition on such monoliths ranges from 5% to 50% by weight, more particularly ranges from 5 to 35% by weight and most particularly ranges from 10 to 25% by weight. In additional embodiments, one or more promoters, stabilizers or both, as described herein, are deposited on the metal oxide impregnated monoliths in addition to the nickel phase. In additional embodiments, one or more of Ru, Pd, Mn or Mg, as described herein, can be deposited on the metal oxide impregnated monoliths in addition to the nickel phase. In specific embodiments, the promoter loading on the monolith by deposition ranges from 0.25 to 10% by weight. In specific embodiments, the stabilizer loading on the monolith by deposition ranges from 5% to 35% by weight. In specific embodiments, the amount of Ni deposited on the monolith support is greater on a weight basis than the amount of stabilizer or promoter, particularly greater than the amount of Mg and/or Mn and greater than the amount of Ru and/or Pd. In specific embodiments, the amount of Ni deposited on the support is greater on a weight basis than the total amount of stabilizer and promoter, particularly greater than the amount of Mg, Mn, Ru, and/or Pd.

In a related embodiment a particulate sorbent of this invention, particularly a sorbent prepared by the nickel deposition method herein, can be extruded to form a monolith. Alternatively, the particulate sorbent can be applied or coated on a monolith as is known in the art. In specific embodiments, the monolith is ceramic.

In a specific embodiment of the invention, nickel metal is deposited on the support by contacting an aqueous solution containing Ni(II) ion ($Ni^{2+}$) having a pH of less than 6, with the support and slowing raising the pH of the solution above 6.0 to cause deposition of $Ni(OH)_2$ on the support. In a specific embodiment of the invention, nickel metal is deposited on the support by contacting an aqueous solution containing Ni(II) ion ($Ni^{2+}$) having a pH of less than 5.5, or more specifically less than 5.2, with the support and slowing raising the pH of the solution above 6.0 up to 7.0 to 8.0 to cause deposition of $Ni(OH)_2$ on the support. Preferably, the temperature of the solution is maintained at 80 to 95° C. during deposition. The deposition of the $Ni(OH)_2$ particles causes the solution conductivity to decrease, hence the deposition is complete when no further conductivity decrease occur in the solution. After deposition of $Ni(OH)_2$, the support is washed with water and dried. The dried support is then calcined at a temperature of 300 to 800° C. typically for 2 to 8 hours. In a specific embodiment, deposition, drying and calcining is repeated one to six times to obtain the desired level of deposition. The intermediate calcination steps are carried out at a temperature of 300 to 800° C. for 2 to 8 hours. The final calcining step is preferably carried out at a temperature of 300 to 800° C. for 2 to 8 hours. This deposition process is believed to provide deposition of $Ni(OH)_2$ nanoparticles on the support, which are converted into a nanoparticle nickel oxide phase during the calcinations steps. Prior to use as a sorbent, the support with the deposited nickel oxide phase is activated by contacting with a reducing gas containing no sulfur. For example, reformate gas containing no sulfur or dilute $H_2$ in $N_2$ (or any inert gas) can be used for activation.

In a specific embodiment, the pH is raised by addition of base. In specific embodiments, pH is raised by addition of a weak base. In a more specific embodiment, pH is raised by addition of ammonia, an ammonium salt or aqueous solutions thereof. More specifically, pH is raised by addition of ammonium carbonate or an aqueous solution thereof. In a preferred embodiment, pH is raised by thermal decomposition of urea to generate ammonium cation ($NH_4^+$) and hydroxyl anion ($OH^-$) at temperatures between 80-95° C. In a specific embodiment, pH is changed by thermal decomposition of ammonium compounds, including but not limited to ammonium carbonate and aqueous ammonia, at temperatures ranging from 80 to 95° C. at ambient pressure. In a specific embodiment, Ni is provided as an aqueous solution of $Ni(NO_3)_2$ hexahydrate, In a specific embodiment, the molar ratio of urea or ammonium compound to $Ni(NO_3)_2$ hexahydrate in the deposition solution ranges from 5:1 to 20:1.

The present invention provides a method for removal of sulfur from or reduction of levels of sulfur in such high temperature gas stream comprising the step of contacting the sorbent with the gas stream to chemisorb hydrogen sulfide, carbonyl sulfide and other sulfur containing species. In a particular embodiment, the level of sulfur in the gas stream is reduced to levels less than or equal to 50 ppbv. In more particular embodiments, the level of sulfur is reduced to less than or equal to 10 ppbv. In additional embodiments, the level of sulfur is reduced to less than or equal to 1 ppbv. In embodiments herein the gas stream prior to contact with the sorbent material contains equal to or greater than 50 ppmv sulfur.

In a particular embodiment, the high temperature gas stream is reformate gas at temperatures above 500° C. or more, specifically at temperatures above 650° C., and more specifically at temperatures from 700 to 800° C. In a particular embodiment, the gas stream contains sulfur levels predominantly as $H_2S$ and COS of 50 ppmv or more. In a particular embodiment, the gas stream contains sulfur levels of 10 ppmv or more. In a particular embodiment, the gas stream contains sulfur levels of 2 ppmv or more.

In an embodiment, the sorbent is regenerable by passage of a flow of regeneration gas containing no sulfur or only low levels of sulfur. The regeneration gas must have levels of sulfur lower than the feed gas into the sorbent to carry out regenerations under isothermal conditions. Preferably the levels of sulfur in the regeneration gas are 10 times lower in sulfur than the feed gas. The regeneration gas preferably has sulfur levels lower than 10 ppbv. The regeneration gas preferably has sulfur levels lower than 1 ppbv. In a specific embodiment, regeneration can also comprise a step of increasing the temperature of the sorbent by up to 150° C. In a specific embodiment, regeneration can also comprise a step of increasing the temperature of the sorbent by up to 100° C. In a specific embodiment, in which the sorbent is employed to provide desulfurized reformate gas to a SOFC, the regeneration gas is anode tail gas which exits the SOFC and contains no sulfur and no oxygen.

In another embodiment, the sorbent is regenerated by passage of a gas containing oxygen, such as air or cathode tail gas from the fuel cell. In this case after regeneration to remove sulfur, the sorbent is preferably reduced, for example, by passage of a reducing gas, which for example can be anode tail gas from the fuel cell or clean reformate gas or dilute hydrogen in nitrogen or inert gas. In a specific embodiment, the reducing gas is desulfurized reformate. Note that systems of the invention can be adapted for regeneration employing cathode tail gas and/or for reduction employing anode tail gas or clean reformate by provision of appropriate conduits and valving as needed. to achieve the gas flows from the fuel cell cathode and/or anode and from the exit of the sorbent element indicated above for regeneration and reduction of sorbent. It will be appreciated by one of ordinary skill in the art with respect to the provision of conduits that appropriate valving may be needed to control gas flows from one device element to another. Valving is not specifically illustrated in the system configurations illustrated herein.

In an embodiment, the invention provides a method for reducing the level of sulfur in high temperature reformate gas to a level sufficiently low that the desulfurized reformate gas can be used in a SOFC or in a molten carbonate fuel cell (MCFC) which comprises the step of contacting the high temperature reformate gas with a sorbent as described herein. In a related embodiment, the invention provides a system for providing desulfurized hydrocarbon reformate gas from a catalytic reformer to a SOFC or MCFC) which comprises:

a source of hydrocarbon reformate gas containing hydrogen sulfide;

one or more desulfurizer units comprising one or more sorbent elements for receiving the reformate gas and reducing the level of sulfur (mainly $H_2S$) in the reformate gas to provide desulfurized reformate gas; wherein the sorbent is a sorbent as described herein; and one or more conduits for passage of the desulfurized reformate gas to a SOFC or MCFC. Sorbent may be provided in the sorbent element as particulate material or as a monolith.

The system optionally further comprises one or more conduits for selective passage of a regeneration gas and, if desired selective passage of a reducing gas, to the one or more sorbent beds for selective regeneration. In a specific embodiment, the system optionally comprises one or more conduits for selective passage of anode tail gas as regeneration gas from the SOFC or MCFC to one or more sorbent beds. In another specific embodiment, the system comprises one or more conduits for selective passage of desulfurized reformate gas as a regeneration and/or reducing gas to one or more sorbent elements. Such a system preferably further comprises one or more conduits for selective passage of the desulfurized reformate to the SOFC. In a specific embodiment, the system further comprises one or more conduits for selective passage of sulfur-containing regeneration gas from one or more sorbent beds to a burner for combustion of $H_2S$ and optional venting.

Additional aspects and embodiments of the invention will be apparent on consideration of the drawing, detailed description and the non-limiting examples.

DETAILED DESCRIPTION OF THE INVENTION

Figure 1:
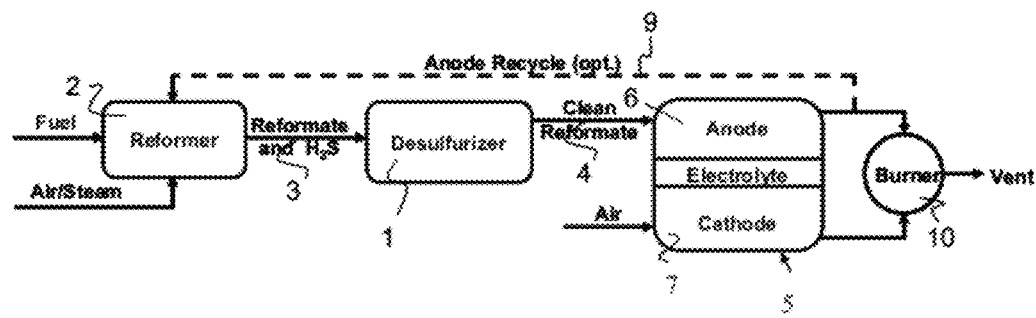
FIG. 1 is a schematic illustration of an exemplary system for removing sulfur from a gas stream employing sorbents of this invention. The system is exemplified for removing sulfur from reformate gas feed to a fuel cell. In the illustrated system the sorbent element is not regenerated in situ.

The invention is further described by reference to the drawings and the following detailed description. In drawings of exemplary device configurations, the same device elements in different drawings are identified with the same reference numbers.

The invention relates to sorbents useful for removing sulfur from gas stream at high temperatures, temperatures over 500° C. and more particularly at temperatures of 700 to 800° C. The invention provides a method for removing sulfur (or for reducing the level of sulfur) in such gas streams by contacting the high temperature gas stream with certain sorbents as described herein. The sorbents of this invention comprise a nickel phase which is supported on a particulate support or on a monolith. The invention also provides a preferred method for depositing the nickel phase on the particulate support or on the monolith. It is believed that the method provided provides for deposition of nanoparticles of nickel material on the support or monolith which provide improved sorbent properties, particularly for removal of sulfur.

In an embodiment, the invention provides a method for removing sulfur from a high temperature gas stream containing sulfur which comprises the step of contacting the gas stream with a sorbent comprising a nickel phase dispersed on a particulate or monolith support. More specifically the high temperature gas stream is at a temperature ranging from 500 to 1000° C. or 700 to 800° C. More specifically the high temperature gas stream is reformate gas. In a specific embodiment the sorbent is a nickel phase dispersed on a particulate support having surface area greater than 100 $m^2/g$. More specifically, the particulate support has average particle size less than 5,000 μm less than 2,500 μm, less than 1,600 μm, less than 500 μm or less than 100 μm. In specific embodiments, the particulate support is a metal oxide or a rare earth-doped metal oxide. In specific embodiments, the support is γ-alumina, or γ-alumina doped with Sc, Yt or La. In specific embodiments, the support is applied to or coated on a monolith support and the nickel phase is deposited thereon. In specific embodiments, the particulate sorbent is applied or coated on a monolith support. In specific embodiments, the sorbent is a nickel phase dispersed on a monolith support, or a monolith support having a particulate metal oxide support applied thereto. In specific embodiments, the sorbent further comprises one or more alkali metals, alkaline earth metals, manganese, ruthenium or palladium which can be impregnated into or deposited upon the support. In a specific embodiment, the sorbent comprises a nickel phase and a manganese phase deposited on a particulate support. In a specific embodiment, this particular support is γ-alumina or La-doped γ-alumina.

In specific embodiment, the nickel phase is deposited on the particulate support or on a monolith support by a process that comprises a step of deposition of nickel from an aqueous solution of a nickel compound or salt by changing the pH of the solution from below pH 6 to above pH 6 in a time period that ranges from 30 minutes to 10 hours. In a specific embodiment, pH is changed by thermal decomposition of urea at temperatures ranging from 80 to 95° C. at ambient pressure, wherein the molar ratio of urea to nickel in the deposition solution ranges from 5:1 to 20:1.

In specific embodiments, the nickel phase is deposited on the support in the form of nanoparticles. In specific embodiments, the size of the nickel oxide crystallites produced by the decomposition of $Ni(OH)_2$ nanoparticles ranges from 2 to 10 nm. In specific embodiments, the size of the nickel oxide crystallites produced by the decomposition of $Ni(OH)_2$ nanoparticles ranges from 5 to 7 nm.

In specific embodiments, the sorbent is a nickel phase dispersed on La-doped γ-alumina which is optionally applied to a monolith support. In other specific embodiments, the sorbent is La-doped γ-alumina with a nickel phase and a manganese phase dispersed thereon which is optionally applied to a monolith support.

In specific embodiments, the nickel phase dispersed on La-doped γ-alumina which is optionally extruded into a monolith. In other specific embodiments, the sorbent is La-doped γ-alumina with a nickel phase and a manganese phase dispersed thereon which is optionally extruded into a monolith.

Contacting as used herein most often refers to contacting a flowing gas stream with the sorbent. For example, by passing a flowing stream of gas through a bed, or column of particulate sorbent or through one or more channels in a monolith having applied sorbent on channel walls. Contact may also be achieved by introduction of a gas into a container containing a sorbent, where the static gas is allowed to contact the sorbent for a selected time period to allow desired sulfur removal.

The sorbents of the invention can be regenerated by removal of adsorbed and otherwise bound sulfur. Typically, regeneration is achieved by passage of a sulfur-free gas in contact with the sorbent. Regeneration can also be performed by passage of a gas containing low levels of sulfur (at most having 10-times less sulfur than the typical gas which is to be desulfurized). The regeneration gas may contain oxygen, such as air. The regeneration gas may contain no oxygen, e.g., dilute hydrogen in nitrogen or inert gas. In cases where a regeneration gas contains oxygen it may be necessary to thereafter pass a reducing gas over the sorbent to activate it. Sorbents of the invention can be used for sulfur removal, regenerated and reused a number of times for sulfur removal without significant degradation of sorbent performance.

In specific embodiments, the sorbents of this invention are employed for sulfur removal from gases, particularly reformate gas, and more particularly reformate gas produced by catalytic hydrocarbon reforming, at temperatures above 500° C. or more specifically at temperatures in the range of 500 to 1000° C. In specific embodiments, sorbents of this invention can be used to reduce sulfur levels in a gas containing 2 ppmv or higher levels of sulfur to 10 ppbv or less of sulfur. In specific embodiments, sorbents of this invention can be used to reduce sulfur levels in a gas containing 2 ppmv or higher levels of sulfur to 1 ppbv or less of sulfur. In specific embodiments, sorbents of this invention can be used to remove sulfur down to levels of 10 ppbv or less or more particularly to levels of 1 ppbv or less from reformate gas generated from sulfur-containing hydrocarbon fuels which contains 2 ppmv or higher levels of sulfur.

The sorbents and methods of this invention can be employed with any high temperature gas stream from which it is desired to remove sulfur, but the sorbents and methods herein are particularly useful to obtain sulfur reduction to sub ppmv levels. A particularly important application of the sorbents and methods herein is the removal of sulfur from reformate gas generated from transportation fuels to levels that are sufficiently low that the reformate gas can be used as feed gas for fuel cells, particularly solid oxide fuel cells. Components of solid oxide fuel cells (particularly the anodes thereof) are very sensitive to the presence of sulfur which can significantly degrade fuel cell performance.

The sorbents and methods of the invention make the use of reformate gas generated from such transportation fuels practical in fuel cells. The sorbents of this invention can be employed to remove sulfur from any reformate gas stream including those generated by a steam reformer, a partial oxidizer, or a catalytic partial oxidizer. In general a reformer is a device that produces a hydrogen-rich gas from hydrocarbon fuels (reformate gas). In specific applications, reformate gas can be used in fuel cells to generate energy. As noted herein, the efficiency of energy generation of fuel cells can be negatively affected by the presence of sulfur in reformate gas. Reformate gas is a gas mixture containing hydrogen and which also may contain CO, $CO_2$ and water. In a particular embodiment, reformate gas includes reformate gas containing levels of water greater than 2.5% by volume. Certain sorbents, e.g., sorbents wherein the support is silica or contains silica are not preferred for sulfur removal from gases which contain levels of water greater than 1%, greater than 2.5% or greater than 4% water by volume.

The invention provides a system for removal of sulfur from a high temperature gas stream which comprises one or more sorbent elements comprising a sorbent of this invention comprising a nickel phase. The invention also provides a system for providing a desulfurization reformate gas to a fuel cell which comprises:

a source of reformate gas containing sulfur;

one or more sorbent elements comprising a sorbent of the invention for receiving the sulfur-containing reformate gas; and at least one gas conduit for providing desulfurized reformate to a fuel cell.

More specifically the invention provides a fuel cell system which comprises a reformer for generating a sulfur-containing reformate gas, a fuel cell for receiving the desulfurized reformate, one or more sorbent elements comprising a sorbent of the invention for receiving the sulfur-containing reformate gas; and at least one gas conduit for providing desulfurized reformate to a fuel cell. In a specific embodiment, the fuel cell is a high temperature fuel cell. In a specific embodiment the fuel cell is a molten carbonate fuel cell. In a specific embodiment the fuel cell is a solid oxide fuel cell.

More specifically, the invention provides a system in which one or more of the sorbent elements is regenerable in situ. In this embodiment, at least one gas conduit is provided for directing regeneration gas to a sorbent element in which the sorbent is in need of regeneration (the sorbent activity of the sorbent has decreases to undesirable levels or the sulfur level exiting the sorbent element has risen to undesirable levels.) In a specific embodiment, one or more gas conduits are provided for directing anode tail gas from the fuel cell to regenerate one or more sorbent elements. In specific embodiments, the sorbent used in the system is a nickel phase dispersed on La-doped γ-alumina or is La-doped γ-alumina with a nickel phase and a manganese phase dispersed thereon.

Figure 2:
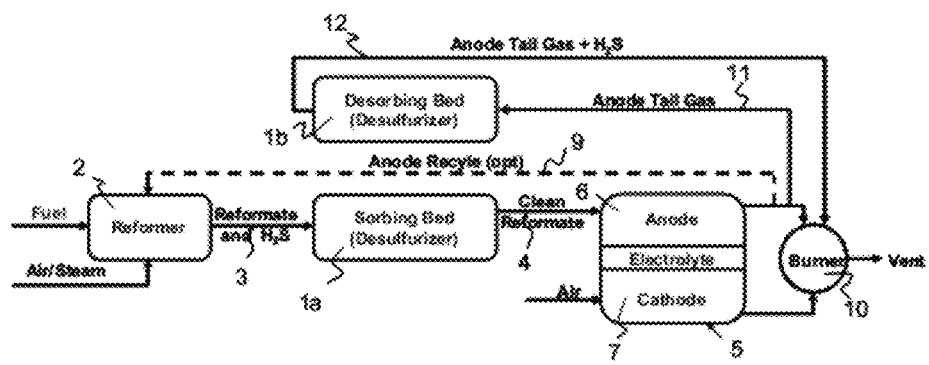
FIG. 2 is a schematic illustration of an exemplary system for removing sulfur from a gas stream employing sorbents of this invention. The system is exemplified for removing sulfur from reformate gas. In the illustrated system, two or more sorbent elements are provided and a system for regeneration of the sorbent elements in situ is provided.

FIGS. 1 and 2 illustrate exemplary fuel cell systems of the invention in which a sorbent of this invention is provided in a desulfurizer (1) to remover sulfur (mainly as $H_2S$) from a reformate gas stream (3) exiting a reformer (2). Clean reformate gas (4) is directed to the anode compartment (6) of fuel cell (5). Gases exiting the anode and cathode compartments of the fuel cell are typically directed to burner (10) prior to venting. At least a portion of the anode tail gas (9) can optionally be recycled to the reformer. Fuel such as (diesel fuel, jet fuel, gasoline, natural gas, liquefied petroleum gas and alcohols) and air are introduced into the reformer which can be any conventional art-known reformer. Air is introduced into the cathode compartment of the fuel cell, which can be any conventional fuel cell. In specific embodiments, this can be a Molten Carbonate Fuel Cell (MCFC). In specific embodiments this can be a solid oxide fuel cell. Again any conventional art-known solid oxide fuel cell can be employed.

FIG. 1 illustrates an embodiment in which the sorbent employed is expendable which is discarded or removed for disposal, recycle or regeneration. The desulfurizer comprises sorbent in one or more sorbent beds or sorbent on one or more monolith supports. The desulfurizer provides for contact between the sorbent and the gas from which sulfur is to be removed.

The desulfurizer contains sorbent of this invention which may be in a variety of forms or configurations. The desulfurizer may contain one or more sorbent elements which may be or contain, for example, a sorbent bed of particles, a cartridge containing sorbent particles, a monolith coated with sorbent or a monolith made out of the sorbent. A variety of sorbent cartridge designs appropriate for use in such systems are known in the art. For example, a cartridge may contain an inert material (e.g., a monolith) formed into a plurality of passageways in which the walls thereof comprise sorbent (e.g., impregnated or coated on the walls.) Sulfur-containing gas is passed through such passageways in order to contact the sorbent. Sorbent may for example be provided in the form of a honeycomb monolith, particularly a monolith made of ceramic, where sulfur-containing gas is passed through the passageways of the honeycomb in contact with sorbent.

It is noted that the system of FIG. 1 does not provide and does not require heat exchangers or any cooling or heating devices to cool the reformate gas prior to desulfurization or to reheat the clean reformate prior to passage to the fuel cell. The desulfurizer will be substantially at the temperature of the fuel cell.

FIG. 2 illustrates an embodiment where the sorbent is regenerated in situ comprising two or more sorbent elements (1a and 1b, two are shown) which may, for example, be sorbent beds or sorbent coated or deposited on one or more monolith structures. In a specific embodiment, the sorbent is provided on the surface of a honeycomb monolith, particularly where the monolith is made of ceramic. This system configuration can provide for continuous removal of sulfur from the flowing gas stream, e.g., reformate gas. For example, reformate gas (3) is directed into sorbent element (1a) and clean reformate (4) is then directed to the anode compartment (6) of the fuel cell (5) as in the system in FIG. 1. Sorbent element (1b) is being regenerated by passage of low-sulfur gas, e.g., anode tail gas 11 (as illustrated) or other appropriate regeneration gas. Gases exiting the fuel cell optionally pass to burner (10) prior to venting.

Additionally, in the system of FIG. 2, regeneration gas exiting the sorbent element and containing sulfur (12) is preferably passed through the burner for combustion of sulfur species desorbed from the sorbent element being regenerated. The two sorbent elements containing sorbent are illustrated as two separate device units, however, the two or more sorbent elements may be housed within a single device unit, but be configured for gas flow such that one element is being regenerated while the other is employed for desulfurization. Gas flows may be reconfigured for switching two stationary sorbent elements between sorbing and desorbing by use of appropriate gas conduits and valves. Alternatively, the two or more sorbent beds can be mechanically configured to allow them to be moved into position to receive appropriate gases (reformate or regeneration gas) and pass desulfurized reformate or sulfur-containing regeneration gas, respectively, to the fuel cell or to the burner for sulfur combustion and venting.

In an optional embodiment, the systems of FIG. 1 or 2 can be provided with a sulfur alarm which generates a warning signal when the level of sulfur in the conduit exiting the desulfurizer (4) is greater than a pre-selected maximum level to prevent damage to the fuel cell. This sulfur alarm may be configured in the system of FIG. 2 to trigger switching of the exhausted sorbent element to desorbing mode and switch of a new or regenerated sorbent element to sorbing mode.

It is noted that the system of FIG. 2 does not provide and does not require heat exchangers or any cooling or heating devices to cool the reformate gas prior to desulfurization or to reheat the clean reformate prior to passage to the fuel cell. The desulfurizer will be substantially at the temperature of the fuel cell. In an optional embodiment, the sorbent element that is being regenerated can be provided with a heater (not shown in FIG. 2) to raise the temperature of the regenerating sorbent element (up to about 150° C.) to facilitate desorption of sulfur.

An exemplary system for continuous removal of a specific gas from a gas stream is provided in published US patent application 2008/0292923 which is incorporated by reference in its entirety herein.

In one embodiment, sorbent materials of this invention comprise a nickel phase dispersed on a support having surface area of 10 $m^2/g$ or higher and more specifically on a support having surface area of 100 $m^2/g$ or higher. Preferably, the support has surface area of 100 $m^2/g$ or greater at temperatures greater than 500° C. and preferably between 700 to 800° C. Certain supports can have surface area of 200 $m^2/g$ or greater at temperatures greater than 500° C. and preferably between 700 to 800° C. The support is preferably thermally stable to changes in phase, structure or morphology at the temperatures above 500° C. and more preferably at temperatures between 700 to 800° C. In a specific embodiment, the support is a metal oxide. In specific embodiments, the support is selected from alumina, titania, zirconia or silica. In more specific embodiments, the support is selected from θ-alumina or γ-alumina. In specific embodiments, the support is a high surface area (greater than 100 $m^2/g$) metal oxide. In specific embodiments, the support is a high surface area titania. In specific embodiments, the support is high surface area zirconia. Various high surface area metal oxides suitable for supports for sorbents of this invention are known in the art and can be prepared by methods that are well-known in the art. In particular, high surface area titania, zirconia and alumina are known in the art.

In specific embodiments, the support is a rare earth doped metal oxide. More specifically the support is a rare earth doped alumina, titania or zirconia. In yet more specific embodiments, the support is a rare earth doped γ-alumina. The rare earth metals include scandium, yttrium and the lanthanoid metals. In specific embodiments, the support is a lanthanum-, scandium-, or yttrium-doped metal oxide, particularly where the metal oxide is alumina and more particularly where the metal oxide is γ-alumina. In specific embodiments, from 2 to 35% by weight of the rare earth is doped into the metal oxide.

In specific embodiments, the sorbent is a high surface area metal oxide comprising a nickel phase deposited thereon. In specific embodiments, the sorbent consists essentially of a nickel phase supported on a metal oxide, particularly a high surface area metal oxide. In specific embodiments, the sorbent consists essentially of a nickel phase supported on titania, zirconia or alumina, particularly a high surface area titania, zirconia or alumina. In specific embodiments, the sorbent consists essentially of a nickel phase supported on alumina, particularly a high surface area alumina, and more particularly high surface area γ-alumina. In specific embodiments, the sorbent consists of a nickel phase supported on titania, zirconia or alumina, particularly a high surface area titania, zirconia or alumina. In specific embodiments, the sorbent consists of a nickel phase supported on alumina, particularly a high surface area alumina, and more particularly high surface area γ-alumina. In these embodiments, the nickel phase loading can range from 5 to 50% by weight. More specifically, nickel loading can range from 10 to 20 wt % or from 10 to 30 wt %.

Ni-containing sorbents of the invention can also contain one or more alkali metals or alkaline earth metals. In certain embodiments, the presence of the alkali or alkaline earth metals improves sulfur capacity of the sorbent. In certain embodiments, the alkali or alkaline earth metal(s) can inhibit or prevent nickel interaction with metal oxide support which is detrimental to sorbent properties. In specific embodiments, the sorbents comprise calcium or magnesium or a mixture thereof in addition to nickel deposited on a support. In specific embodiments, the sorbents comprise calcium or magnesium or a mixture thereof impregnated into a support with a nickel phase deposited thereon. In specific embodiments, the loading of alkali or alkaline earth metal on the support ranges from 2 to 35 wt %, or more specifically from 2 to 20 wt %. In specific embodiments, the support is a metal oxide. In specific embodiments, the support is zirconia, titania or alumina. In specific embodiments, the support is a rare earth-doped metal oxide. In specific embodiments, the support is La-doped γ-alumina.

Ni-containing sorbents of the invention can also contain manganese. In certain embodiments, the presence of manganese improves sulfur capacity of the sorbent and can inhibit or prevent nickel interaction with metal oxide support which is detrimental to sorbent properties. In specific embodiments, the sorbents comprise a manganese phase in addition to a nickel phase deposited on a support. In specific embodiments, the sorbents comprise manganese impregnated into a support with a nickel phase deposited thereon. In specific embodiments, the loading of manganese on the support ranges from 2 to 35 wt %, or more specifically from 2 to 20 wt % or from 5 to 20 wt %. In specific embodiments, the support is a metal oxide. In specific embodiments, the support is zirconia, titania or alumina. In specific embodiments, the support is a rare earth-doped metal oxide. In specific embodiments, the support is La-doped γ-alumina.

In specific embodiments herein, the sorbent of the invention exhibits sulfur capacity ranging from 0.3 up to 1.5% wt. In other embodiments, the sorbent of the invention is a particulate sorbent and exhibits sulfur capacity ranging from 0.6 to 1.5% wt. In other embodiments, the sorbent of the invention is a monolith sorbent and exhibits sulfur capacity ranging from 0.1 to 0.3% wt.

Ni-containing sorbents of the invention can also contain one or more promoter metals selected from ruthenium and/or palladium. The presence of these promoter metals can in certain embodiments enhance sulfur capacity of the sorbent. In specific embodiments, the sorbents comprise Ru and/or Pd in addition to a nickel phase deposited on a support. In specific embodiments, the sorbents comprise Ru and/or Pd impregnated into a support with a nickel phase deposited thereon. In specific embodiments, the loading of Ru and/or Pd on the support ranges from 0.1 to 20 wt %, or more specifically from 0.2 to 10 wt %, or from 0.5 to 10 wt %. In specific embodiments, the support is a metal oxide. In specific embodiments, the support is zirconia, titania or alumina. In specific embodiments, the support is a rare earth-doped metal oxide. In specific embodiments, the support is La-doped γ-alumina.

Ni-containing sorbents of the invention can also contain one or more alkali or alkaline earth metals and manganese. In specific embodiments, the sorbent comprises one or more alkali or alkaline earth metals, a manganese phase and a nickel phase deposited on a support. In specific embodiments, the sorbents comprise one or more alkali or alkaline earth metals (particularly Ca or Mg), and manganese impregnated into a support with a nickel phase deposited thereon. Ni-containing sorbents of the invention can also contain one or more of Ru or Pd and manganese. In specific embodiments, the sorbent comprises one or more of Ru or Pd, a manganese phase and a nickel phase deposited on a support. In specific embodiments, the sorbents comprise one or more of Ru or Pd and manganese impregnated into a support with a nickel phase deposited thereon. Ni-containing sorbents of the invention can also contain, one or more alkali or alkaline earth metals, one or more of Ru or Pd and manganese. In specific embodiments, the sorbent comprises one or more alkali or alkaline earth metals, Ru or Pd, and a manganese phase and a nickel phase deposited on a support. In specific embodiments, the sorbents comprise one or more of an alkali or alkaline earth metal, Ru or Pd and/or manganese impregnated into a support with a nickel phase deposited thereon.

In specific embodiments, the sorbents of the invention consist essentially of a support having one or more of an alkali metal, an alkaline earth metal, Ru, Pd or Mn deposited thereon and having a nickel phase deposited thereon. In specific embodiments, the sorbents of the invention consist essentially of a support having one or more of an alkali metal, an alkaline earth metal, Ru, Pd or Mn impregnated therein and a nickel phase deposited thereon. In specific embodiments, the sorbents of the invention consist of a support having one or more of an alkali metal, an alkaline earth metal, Ru, Pd or Mn deposited thereon and having a nickel phase deposited thereon. In specific embodiments, the sorbents of the invention consist of a support having one or more of an alkali metal, an alkaline earth metal, Ru, Pd or Mn impregnated therein and a nickel phase deposited thereon. In specific embodiments, the sorbents of the invention consist essentially of a support having one or more of Ca, Mg, Ru, Pd or Mn impregnated therein and a nickel phase deposited thereon. In specific embodiments, the sorbents of the invention consist of a support having one or more of Ca, Mg, Ru, Pd or Mn impregnated therein and a nickel phase deposited thereon. In specific embodiments, the sorbents of the invention consist essentially of a support having one or more of Ca, Mg, Ru, or Pd impregnated therein, and a manganese phase deposited thereon and a nickel phase deposited thereon. In specific embodiments, the sorbents of the invention consist of a support having one or more of Ca, Mg, Ru, or Pd impregnated therein, and a manganese phase and a nickel phase deposited thereon.

In specific embodiments, the sorbent of the invention is prepared on a monolith structure. In general any art-known method for depositing a nickel phase on a monolith material can be used. In specific embodiments, the monolith material is a ceramic. In more specific embodiments, the monolith material is a metal oxide, particularly alumina or zirconia. In more specific embodiments, the monolith material is cordierite.

In specific embodiments, nickel is deposited on particulate supports from an aqueous solution containing nickel ions by slowly raising the pH from below 6 (5.25-5.5) to above 6.

In specific embodiments, a particulate Ni-containing sorbent of this invention is coated or otherwise deposited on the monolith. Exemplary coating methods are described in the examples herein. Multiple coating steps may be employed.

In specific embodiments, a particulate support of this invention is coated or otherwise deposited on the monolith and thereafter a nickel phase is deposited thereon. Exemplary coating methods are described in the examples herein. Multiple coating steps may be employed to coat the support on the monolith. In a specific embodiment, nickel is deposited on the monolith from an aqueous solution containing nickel ions by slowly raising the pH from below 6 to above 6. In a related embodiment, a support of this invention is first impregnated with one or more alkali metals, alkaline earth metals, (particularly Ca or Mg), manganese, ruthenium or palladium. Exemplary coating methods are described in the examples herein. Multiple coating steps may be employed to coat the support on the monolith. After calcination, the impregnated support is coated or otherwise deposited on the monolith and thereafter a nickel phase is deposited thereon. In a specific embodiment, nickel is deposited on the monolith from an aqueous solution containing nickel ions by slowly raising the pH from below 6 to above 6. In a specific embodiment, the support is a metal oxide, particularly a high surface area metal oxide, and more particularly zirconia, titania or alumina, particularly γ-alumina. In another embodiment, the support is a rare earth doped metal oxide, particularly a rare earth doped alumina, and more particularly a rare earth doped γ-alumina. In another embodiment, the support is La-doped γ-alumina. In another embodiment, the monolith is coated with La-doped γ-alumina impregnated with one or more of an alkai metal, an alkaline earth metal, manganese, ruthenium or palladium.

In another embodiment, the monolith is impregnated with a metal oxide and thereafter a nickel phase is deposited thereon. Exemplary methods for impregnation of the monolith and nickel deposition are described herein. In a specific embodiment, the monolith is alumina, ziconia or titania which is impregnated with an alkaline earth oxide, particularly calcium oxide.

In a specific embodiment of the invention, the nickel phase is deposited on the support by contacting an aqueous solution containing Ni(II) ion ($Ni^{2+}$) having a pH of less than 5.5, and more preferably less than 5.2 with the support and slowly raising the pH of the solution above 6.0, and more preferably above 7.0, to cause deposition of Ni as $Ni(OH)_2$ on the support. Preferably, the temperature of the solution is maintained at 80 to 95° C. during deposition. After deposition of $Ni(OH)_2$, the support is washed with water and dried. The dried support is then calcined at a temperature of 300 to 800° C., preferably 300 to 500° C., more preferably 350° C. in air. It is also possible to use an inert gas (such as $N_2$ or He) or a reducing gas (such as $H_2$) for calcination. In a specific embodiment, deposition, drying and calcination are repeated one to four times to obtain the desired level of deposition. All intermediate calcination steps are carried out at a temperature of 300 to 800° C. for 2 to 8 hours. The final calcination step is preferably carried out at a temperature of 300 to 800° C. for 2 to 8 hours.

In a specific embodiment, the pH is raised by addition of base. In specific embodiments, pH is raised by addition of a weak base. In a more specific embodiment, pH is raised by addition of ammonia, an ammonium compound, an ammonium salt or aqueous solutions thereof. More specifically, pH is raised by addition of ammonium carbonate or an aqueous solution thereof. In a preferred embodiment, pH is raised by thermal decomposition of urea to generate ammonium cation ($NH_4^+$) and hydroxyl anion ($OH^-$) at temperatures between 80-95° C. In a specific embodiment, Ni is provided as an aqueous solution of $Ni(NO_3)_2$ hexahydrate, In a specific embodiment, the molar ratio of urea to $Ni(NO_3)_2$ hexahydrate in the deposition solution ranges from 5:1 to 20:1. In a specific embodiment, the molar ratio of urea to nickel in the deposition solution is 10:1 to 20:1.

In an embodiment of this deposition method base is added or generated in the Ni solution such that the pH is slowly raised from 5.2 to 5.5 to over pH 6 in a time ranging from 30 m to 10 h. In a more specific embodiment, pH is raised from 5.2-5.5 to over 6 in a time ranging from 30 m to 3 h or from 1 h to 3 h.

Any water-soluble nickel salt can be employed as the nickel precursor in this deposition method, for example, nickel nitrate, nickel chloride ($NiCl_2$) or nickel sulfate ($NiSO_4$) can also be used. In addition, it is also possible to use other nickel precursors that have limited solubility in water, such as nickel acetate [$Ni(CH_3COO)_2$]. Although compounds with low water solubility have lower nickel concentrations in the deposition solution, the continuous removal of nickel from the solution due to the deposition process, pulls more nickel into solution and allows desired levels of nickel deposition.

Figure 3:
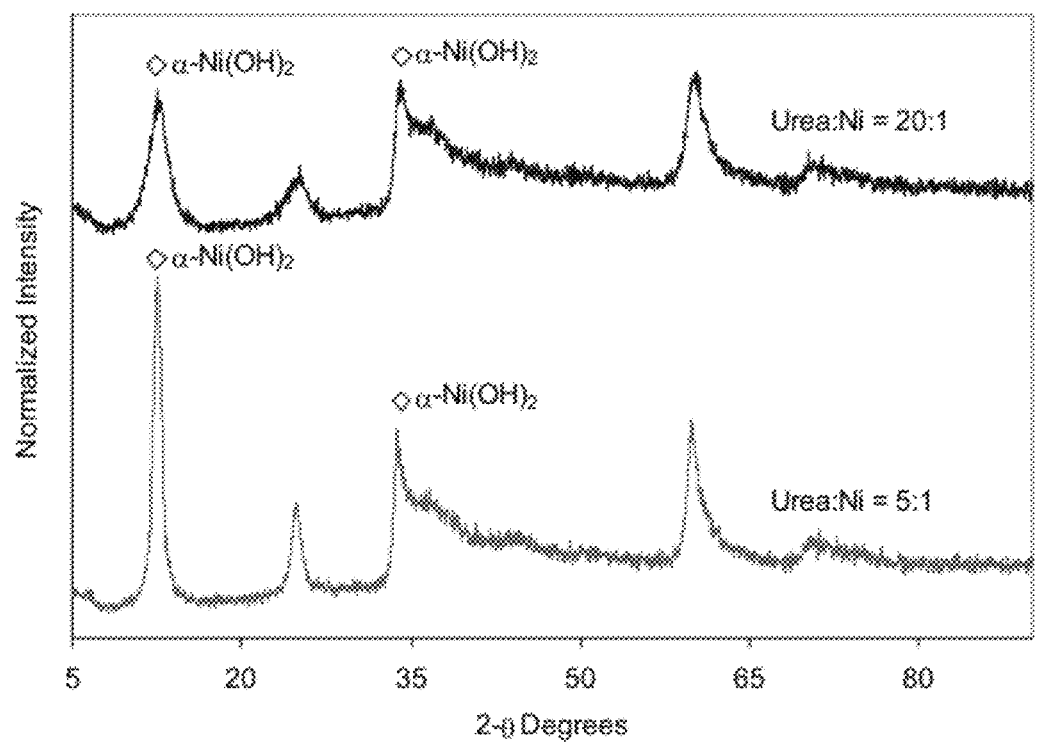
FIG. 3 shows the X-ray diffraction pattern of the recovered $Ni(OH)_2$ phase as described in the text.

This deposition process is believed to provide deposition of $Ni(OH)_2$ nanoparticles on the support, which on calcination decomposes to nickel oxide. This deposition process is believed to be providing α-$Ni(OH)_2$ phase, which is believed to result in a more active sorbent than other $Ni(OH)_2$ phases. FIG. 3 shows the X-ray diffraction pattern of the recovered $Ni(OH)_2$ phase prepared by using different weight ratios of urea:$NiNO_3.6H_2O$. The peak around $2\theta=12°$ and the broad asymmetric band around $2\theta=32-36°$ are typical for α-$Ni(OH)_2$. Prior to use as a sorbent, the support with deposited NiO is activated by contacting with a reducing gas containing no sulfur. For example, reformate gas containing no sulfur or dilute $H_2$ in $N_2$ (or any inert gas) can be used for activation. The activation under reducing gas leads to a reduced nickel state on the support, which is believed to be mostly metallic nickel. The sorbent when exposed to sulfur containing reformate stream is believed to remove the sulfur for the most part by chemisorption.

In specific embodiments, herein the sorbent employed in the methods and systems herein does not contain zinc or zinc oxide. In other embodiments herein the sorbent does not contain cerium, or does not contain cerium oxide or a support of the sorbents herein is not cerium oxide. In a specific embodiment herein, a metal oxide support herein does not contain cerium or cerium oxide. In an embodiment herein a sorbent of the invention contains less than 10% wt of Mn. In an embodiment herein a sorbent of the invention contains less than 7% wt of Mn.

When a Markush group or other grouping is used herein, all individual members of the group and all combinations and possible subcombinations of the group are intended to be individually included in the disclosure. Every combination of components or materials described or exemplified herein can be used to practice the invention, unless otherwise stated. One of ordinary skill in the art will appreciate that methods, device elements, and materials other than those specifically exemplified can be employed in the practice of the invention without resort to undue experimentation. All art-known functional equivalents, of any such methods, device elements, and materials are intended to be included in this invention.

Whenever a range is given in the specification, for example, a temperature range, a time range, or a composition range, all intermediate ranges and all subranges, as well as, all individual values included in the ranges given are intended to be included in the disclosure. Any one or more individual members of a range or group disclosed herein can be excluded from a claim of this invention. The invention as illustratively described herein suitably may be practiced in the absence of any element or elements, limitation or limitations which is not specifically disclosed herein. More specifically, sorbent compositions as described herein may be practiced in the absence of any chemical species which is not specifically disclosed herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The term "comprising" is intended to be broader than the terms "consisting essentially of" and "consisting of", however, the term "comprising" as used herein in its broadest sense is intended to encompass the narrower terms "consisting essentially of" and "consisting of:", thus the term "comprising" can be replaced with "consisting essentially of" to exclude steps that do not materially affect the basic and novel characteristics of the claims and "comprising" can be replaced with "consisting of" to exclude not recited claim elements.

Although the description herein contains many specifics, these should not be construed as limiting the scope of the invention, but as merely providing illustrations of some of the embodiments of the invention.

Each reference cited herein is hereby incorporated by reference in its entirety. However, if any inconsistency arises between a cited reference and the present disclosure, the present disclosure takes precedent. Some references provided herein are incorporated by reference to provide details concerning the state of the art prior to the filing of this application, other references may be cited to provide additional or alternative device elements, additional or alternative materials, additional or alternative methods of analysis or applications of the invention. Patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

One of ordinary skill in the art will appreciate that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLES

Example 1

Preparation and Evaluation of Sorbent—20% Ni/$\gamma$-Al$_2$O$_3$

Figure 4:
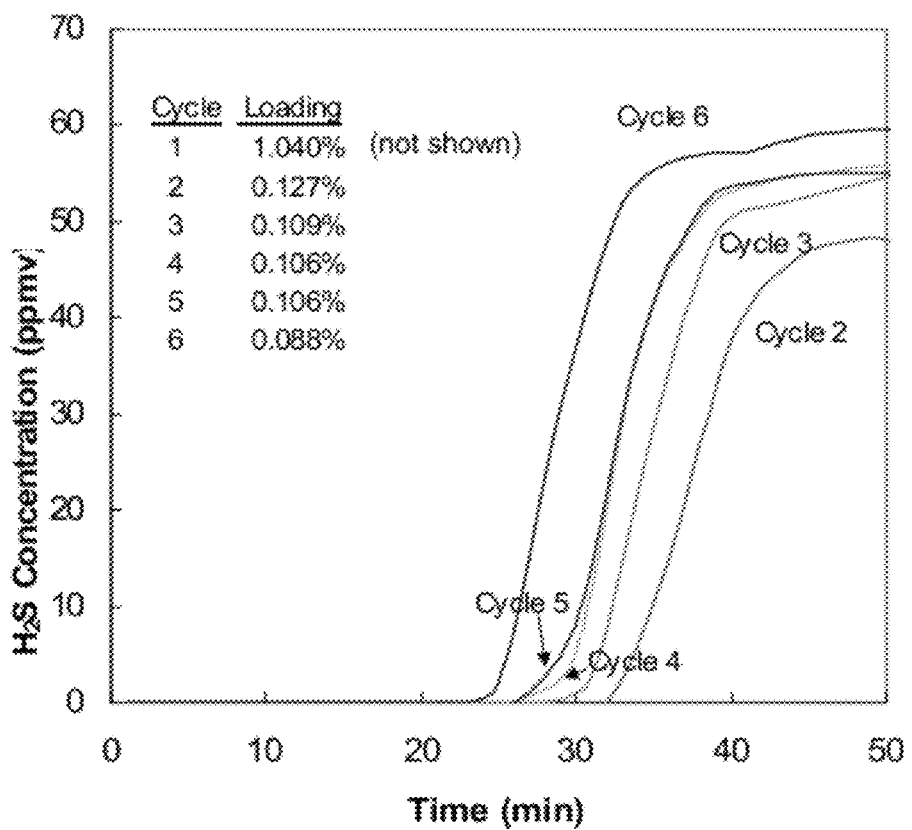
FIG. 4 is a graph showing sorbent (20% Ni/γ-$Al_2O_3$) performance for desulfurization of simulated reformate gas, where T=700° C., 50 ppmv $H_2S$, $H_2$=40% vol., $H_2O$=2.4% vol., balance $N_2$; and GHSV=15,000 $h^{-1}$, as described in Example 1.

Nickel nitrate hexahydrate (10 g) is dissolved in 100 mL DI water along with excess urea (40 g). To this solution 9 g of $\gamma$-Al$_2$O$_3$ of uniform particle size (between 210 μm to 590 μm) is added and the solution is heated to 95° C. After 6 h at a final pH approaching 8, the alumina pellets are filtered and washed with 400 mL DI water and dried. The dried alumina is then calcined at 350° C. for 6 hours. The procedure is repeated to increase the nickel loading to 20% by weight. After the second treatment the sample is calcined at 350° C. for 2-4 h. It was found that this process resulted in the decomposition of the Ni(OH)$_2$ phase and a material with uniform coating of nickel oxide nanoparticles on the alumina pellets. It was also found that sorbent performance was substantially improved if the sample was activated prior to use by contacting the sample with a reducing gas such as the clean reformate (sulfur-free) gas or a dilute hydrogen in N$_2$ (or any inert gas) stream at temperatures in excess of 350° C. and up to 800° C. Multiple cycle tests were carried out with this sorbent at 700° C. in a simulated reformate gas stream containing 50 ppmv H$_2$S, 40% H$_2$, 2.4% H$_2$O in N$_2$. The results are provided in FIG. 4. The breakthrough time for cycle 1 is 304 min (not shown in FIG. 4) and for cycle 1 the sorbent had a loading of 1.04% wt. sulfur, i.e., g of sulfur removed per 100 g of sorbent (5.4 mg S/cm$^3$). For following cycles (2-6), the sorbent maintained a stable capacity of 0.09% wt. sulfur loading when the desulfurized reformate gas stream at GHSV=15,000 h$^{-1}$ (i.e., reformate gas stream without any H$_2$S) was used for regeneration at T=785° C., for 1-2 hours. During the regeneration test, the adsorbed sulfur elutes as H$_2$S into the clean reformate purge where it is measured by a gas chromatograph equipped with either a sulfur chemiluminescence detector (GC-SCD) or a flame photo-ionization detector (GC-FPD). The sorbent does not appear to regenerate fully in the relatively short regeneration time employed in these experiments and under the mild conditions selected for regeneration not all the sulfur bound to the surface is released. Additionally, it is currently believed that some of the active nickel may be lost as nickel aluminate.

Figure 5:
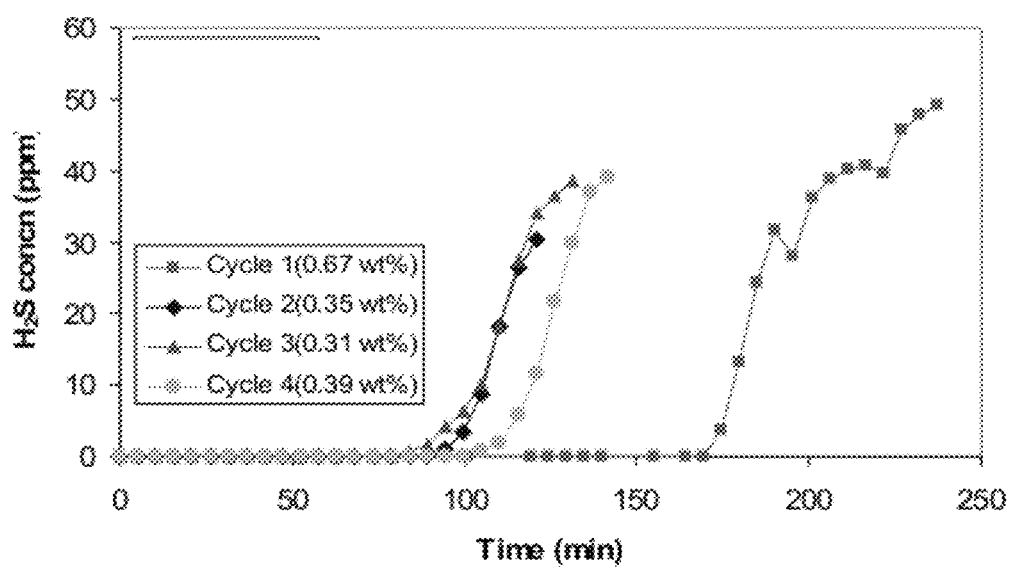
FIG. 5 is a graph showing sorbent (20% Ni/γ-$Al_2O_3$) performance for desulfurization of simulated reformate gas, where T=750° C., 50 ppmv $H_2S$, $H_2$=40% vol., $H_2O$=4.7% vol., balance $N_2$, GHSV=15,000 $h^{-1}$.

We also carried out multiple cycle tests with the 20% Ni/γ-$Al_2O_3$ sorbent at 750° C. a simulated reformate gas stream containing 50 ppmv $H_2S$, 40% $H_2$, 4.7% $H_2O$ in $N_2$. The results are provided in FIG. 5. At cycle 1, the sorbent had a loading of 0.67% wt. (3.5 mg S/$cm^3$) sulfur and the sorbent maintained a stable capacity of ~0.39% wt. sulfur loading when we used air for regeneration at T=750° C. The sulfur elutes from the sorbent during regeneration as $SO_2$ (with only minor amounts of $H_2S$). The sorbent after air regeneration could also be reactivated using a clean reformate (sulfur-free) stream or a dilute hydrogen stream at temperatures in excess of 350° C. and up to 800° C. to provide improved performance after air regeneration.

We carried out multiple cycle tests with the 20% Ni/γ-$Al_2O_3$ sorbent at 700° C. in a simulated reformate gas stream containing 50 ppmv $H_2S$, 30% $H_2$, 30% CO, 2% $CO_2$, 2.4% $H_2O$ in $N_2$. The results are provided in Table 1. At Cycle 1, the sorbent had a loading of 1.02% wt. sulfur (5.3 mg S/$cm^3$) and the sorbent maintained a stable capacity of ~0.09% wt. sulfur loading when we used the desulfurized reformate gas stream (i.e., reformate gas stream without any $H_2S$) for regeneration at T=785° C.

TABLE 1

20%Ni/γ-$Al_2O_3$ sorbent performance for reformate gas desulfurization in the presence of CO. T = 700° C., 50 ppmv $H_2S$, $H_2$ = 30% vol., CO = 30% vol., $CO_2$ = 2% vol., $H_2O$ = 2.4 % vol., balance $N_2$, GHSV = 15,000 $h^{-1}$.

| Cycle # | Breakthrough h time (min) | Breakthrough loading % wt. S | mg S/$cm^3$ |
|---|---|---|---|
| 1 | 293 | 1.016% | 5.23 |
| 2 | 34 | 0.118% | 0.61 |
| 3 | 42 | 0.146% | 0.75 |
| 4 | 38 | 0.132% | 0.68 |
| 5 | 33 | 0.114% | 0.59 |
| 6 | 33 | 0.114% | 0.59 |
| 7 | 30 | 0.104% | 0.54 |
| 8 | 30 | 0.104% | 0.54 |
| 9 | 30 | 0.104% | 0.54 |
| 10 | 20 | 0.069% | 0.36 |
| 11 | 24 | 0.083% | 0.43 |
| 12 | 24 | 0.083% | 0.43 |
| 13 | 20 | 0.069% | 0.36 |
| 14 | 24 | 0.083% | 0.43 |
| 15 | 25 | 0.087% | 0.45 |

Example 2

Preparation and Evaluation of Sorbent—20% Ni/La—$Al_2O_3$

Nickel nitrate hexahydrate (10 g) is dissolved in 100 mL DI water along with excess urea (40 g). To this solution 9 g of La—$Al_2O_3$ (La-doped alumina) of uniform particle size (between 210 μm to 590 μm) is added and the solution is heated to 95° C. La-doped alumina was obtained from BASF (Product No. G200L: with 3.6 to 4.4 wt % La) which has a surface area of 209 $m^2$/g at 500° C. After 6 h at a final pH of 8, the alumina pellets are filtered and washed with 400 mL DI water and dried. The procedure is repeated to further increase the nickel loading to 20% with intermediate calcination step carried out at 350° C. for 6 hours. After the second treatment the sample is calcined at 350° C. for 4 hours to obtain a coating of nickel oxide nanoparticles on the alumina pellets. The coating of nickel oxide nanoparticle on the support appears to be uniform in view of the color gradient observed on the material. The sorbent performance is substantially improved if activated (for 30-60 min) prior to use using a clean reformate (sulfur-free) stream or a dilute hydrogen stream at temperatures in excess of 350° C. and up to 800° C.

Figure 6:
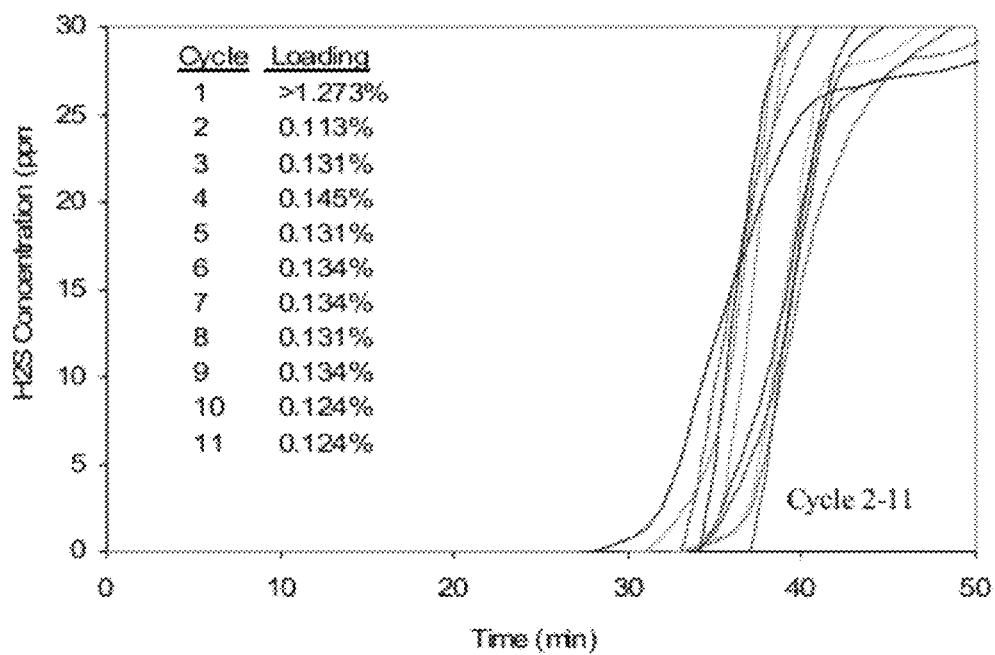
FIG. 6 is a graph showing sorbent 20% Ni/La—$Al_2O_3$ performance for desulfurization of simulated reformate gas, where T=700 C., 50 ppmv $H_2S$, $H_2$=40% vol., $H_2O$=2.4% vol., balance $N_2$, GHSV=15,000 $h^{-1}$.

We carried out multiple cycle tests with this sorbent at 700° C. in a stimulated reformate gas stream containing 50 ppmv $H_2S$, 40% $H_2$, 2.4% $H_2O$ in $N_2$. The results are provided in FIG. 6 In Cycle 1, sulfur did not breakthrough for 6 hours with a sorbent loading in excess of 1.273% wt. sulfur (the breakthrough curve for cycle 1 is not shown). The sorbent maintained a stable capacity of ~0.13% wt. sulfur loading thereafter when we used the desulfurized reformate gas stream (i.e., reformate gas stream without any $H_2S$) for regeneration at T=785° C. Breakthrough time for cycles 2-11 is between 30 and 40 min.

Example 3

Preparation of Mn-Containing Sorbent—20% Mn 30% Ni/La—$Al_2O_3$

Figure 7:
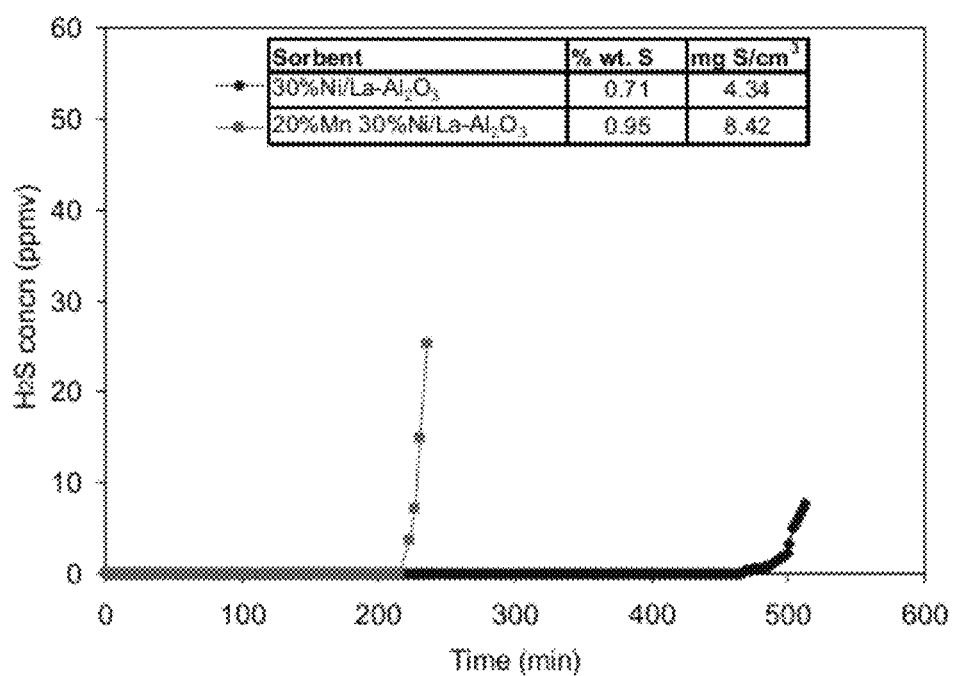
FIG. 7 is a graph showing performance for Mn containing sorbent (20% Mn 30% Ni/La—$Al_2O_3$) for reformate gas desulfurization, where T=700° C., 50 ppmv $H_2S$, $H_2$=30% vol., CO=30% vol., $CO_2$=2% vol., $H_2O$=2.4% vol., balance $N_2$, GHSV=15,000 $h^{-1}$.

La-doped alumina particles (between 210 μm to 590 μm) (BASF Product No. G200L with 3.6 to 4.4% by weight La) are impregnated with $Mn(NO_3)_2$ solution (up to 20% wt. Mn) and calcined at 700° C. for 9 hours. The nickel deposition on the calcined Mn-dispersed La-doped alumina particles is then carried out using nickel-urea solution as described in Example 1. The nickel deposition is repeated three times to achieve a Ni loading of 30% wt. with intermediate calcination steps carried out at 350° C. for 6 hours. The sorbent performance is improved if activated prior to use using a clean reformate (sulfur-free) stream or a dilute hydrogen stream at temperatures in excess of 350° C. and up to 800° C. In order to compare the effect of manganese promoter we also prepared a 30% Ni/La—$Al_2O_3$ sample without manganese impregnation following the same procedure. We tested these samples at 700° C. in a simulated reformate gas stream containing 50 ppmv $H_2S$, 30% $H_2$, 30% CO, 2% $CO_2$, 2.4% $H_2O$ in $N_2$. The results are provided in FIG. 7, which also shows sulfur loading of the sorbents. The manganese containing sample achieved significantly higher sulfur loading both on unit weight and unit volume basis.

Example 4

Preparation and Evaluation of Different Supports

We prepared 10% Ni and 20% Ni on different support materials, such as γ-$Al_2O_3$, α-$Al_2O_3$, $SiO_2$, MgO, $TiO_2$ and $ZrO_2$ following the standard Ni deposition approach of Example 1. The calcined sorbent samples are further activated prior to use using a clean reformate (sulfur-free) stream or a dilute hydrogen stream at temperatures in excess of 350° C. and up to 800° C.

We tested the 10% Ni loaded samples at 750° C. in a simulated reformate gas stream containing 50 ppmv $H_2S$, 40% $H_2$, 4.7% $H_2O$ in $N_2$. We tested the 20% Ni loaded samples at 700° C. in a simulated reformate gas stream containing 50 ppmv $H_2S$, 40% $H_2$, 2.4% $H_2O$ in $N_2$. The sulfur loading of the fresh activated sorbents are provided in Table 2. This shows that any of these supports can be used while $Al_2O_3$ support provides the best performance.

TABLE 2

Impact of different supports on sorbent performance for reformate gas desulfurization.

| Sorbent | $T_{ads}$ (° C.) | % wt. S | mg S/cm³ |
|---|---|---|---|
| 10% Ni/γ-Al₂O₃ | 750 | 0.46 | 2.08 |
| 10% Ni/MgO | 750 | 0.32 | 0.47 |
| 10% Ni/TiO₂ | 750 | 0.19 | 0.85 |
| 10% Ni/ZrO₂ | 750 | 0.12 | 0.57 |
| 20% Ni/α-Al₂O₃ | 700 | 0.36 | 3.21 |
| 20% Ni/γ-Al₂O₃ | 700 | 0.70 | 3.51 |
| 20% Ni/SiO₂ | 700 | 0.78 | 2.58 |

Example 5

Impact of Ni Content

Figure 8A:
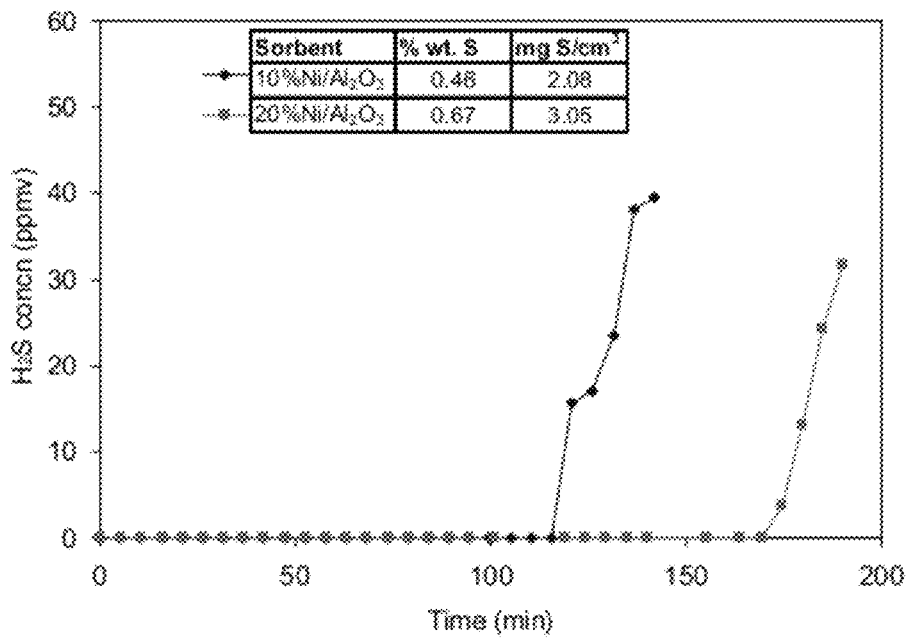
FIGS. 8A and 8B are graphs showing the impact of Ni content on sorbent performance for reformate gas desulfurization. For FIG. 8A, T=750° C., 50 ppmv $H_2S$, $H_2$=40% vol., $H_2O$=4.7% vol., balance $N_2$, GHSV=15,000 $h^{-1}$. For FIG. 8B, T=700° C., 50 ppmv $H_2S$, $H_2$=40% vol., $H_2O$=2.4% vol., balance $N_2$, GHSV=15,000 $h^{-1}$.
Figure 8B:
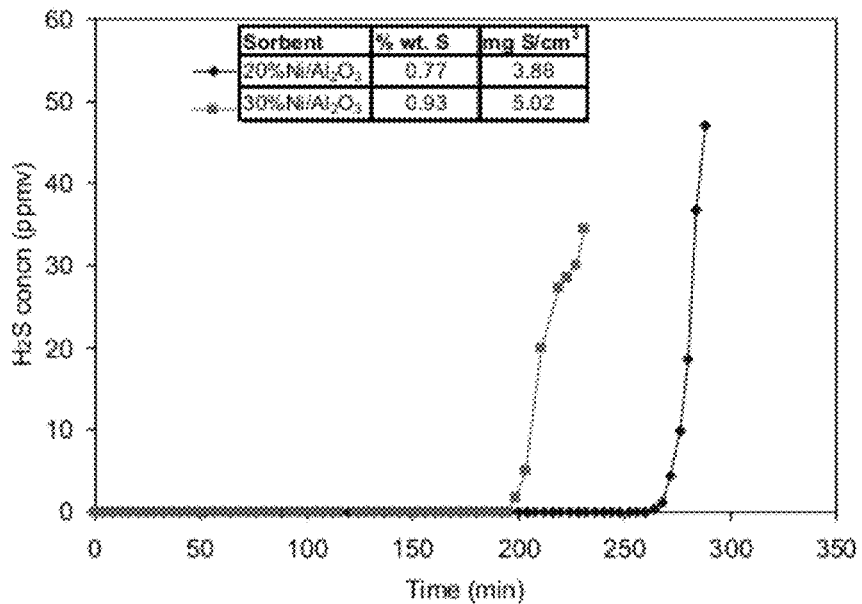

We prepared different samples in which the nickel content varied by increasing the number of deposition steps. For these preparations, we used the γ-alumina support phase, which was prepared in the form of 210 μm to 590 μm size granules. Each deposition was carried out as explained in Example 1, maintaining identical preparation parameters such as temperature, the deposition duration etc. with a targeted 10% weight nickel deposition in each treatment. So, as we carried out more treatments, we effectively increased the nickel content of the samples (10% wt., 20% wt. and 30% wt., for one-time, two-times and three-times treated samples, respectively). We applied a drying step at 350° C. under air for 6 hr to dry up the granules after each deposition step and remove any solution. Prior to testing all samples were reduced at 700° C. using a 2% H₂/nitrogen mixture. We tested these samples at 700° C. and 750° C. in a simulated reformate gas stream containing 50 ppmv H₂S, 40% H₂, 2.4 to 4.7% H₂O in N₂. The results are provided in FIGS. 8A and 8B. Higher Ni content provided better performance.

Example 6

Impact of Urea/Ni Ratio

Figure 9:
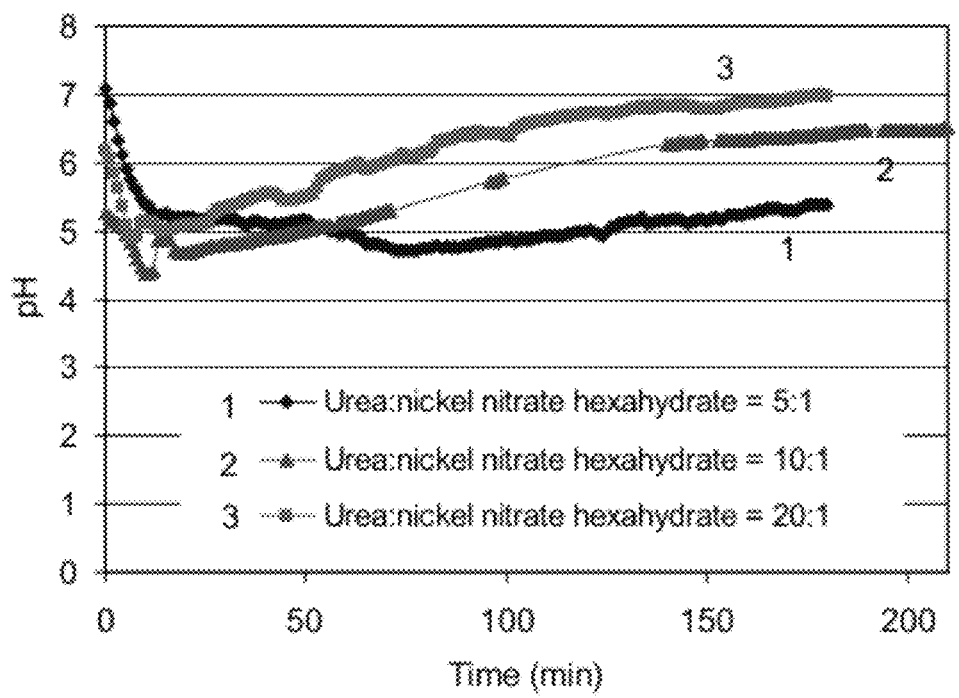
FIG. 9 is a graph showing change in pH with time during deposition as described in Example 6.

We prepared several Mn-stabilized La-doped alumina formulations based on the described in Example 3. We varied the urea/Ni ratio in these preparations to assess its impact on sorbent performance. We prepared sorbent samples using different molar ratios of urea:Ni(NO₃)₂.6H₂O (molar ratio was varied from 5:1 to 20:1). The results are provided in Table 3. The increase of urea to nickel ratio from 5:1 to 20:1 provided almost a 5-fold improvement in sulfur loading, while ratios greater than 10:1 did not show significant further improvements in sulfur loading. We believe that the reason for the low activity of the urea:Ni(NO₃)₂.6H₂O sample prepared using a molar ratio of 5:1 was because the pH of this solution was below 5.5 and resulted in very slow nickel deposition rates. FIG. 9 is a graph illustrating pH change with time during deposition for urea:nickel nitrate hexahydrate molar ratios of 5:1; 10:1 and 20:1. Ni(OH)₂ precipitation starts to progress rapidly as the pH increases above 5.5. Our results also suggest that increasing pH further (as by increased urea content of the starting solution) will not result in further improvement in the performance.

TABLE 3

Impact of Urea:Ni ratio on (20% Mn 30% Ni/La—Al₂O₃) sorbent performance for reformate gas desulfurization.

| Urea:Ni(NO₃)₂•6H₂O (molar ratio) | % wt. S | mg S/cm³ |
|---|---|---|
| 5:1 | 0.12 | 1.26 |
| 10:1 | 0.60 | 5.96 |
| 15:1 | 0.61 | 5.98 |
| 20:1 | 0.62 | 5.75 |

Example 7

Impact of Number of Deposition Steps

We prepared 20% Mn 20% Ni/La—Al₂O₃ samples using a single deposition (urea treatment) step and two steps as in Example 1 to achieve 20% Ni loading on the sorbent. We also prepared 20% Mn 30% Ni/La—Al₂O₃ samples using a two deposition (urea treatment) and a three step process to achieve 30% Ni loading on the sorbent. We tested these samples at 700° C. in simulated reformate gas stream containing 50 ppmv H₂S, 40% H₂, 2.4% H₂O in N₂. The sulfur loading of the fresh activated sorbents are provided in Table 4. The sample prepared using two or more treatment steps provided significantly better sulfur loading than the 1-treatment sample, while there is no significant difference in the sorbent performance between two and three step depositions.

TABLE 4

Impact of urea treatment (Ni deposition) steps on sorbent performance for reformate gas desulfurization.

| Sorbent | No. of urea treatments | % wt. S | mg S/cm³ |
|---|---|---|---|
| 20%Mn/20%Ni/La—Al₂O₃ | 1 | 0.45 | 4.39 |
|  | 2 | 0.72 | 5.24 |
| 20%Mn/30%Ni/La—Al₂O₃ | 2 | 0.58 | 5.41 |
|  | 3 | 0.61 | 5.69 |

Example 8

Impact of Particle Size

In general, in sorbent applications, the particle size of the sorbent can play a role in the breakthrough capacity. Sorbents prepared in the form of smaller size granules are expected to achieve a higher sulfur breakthrough capacity than larger size granules, because smaller particles allow faster diffusion of sulfur into the sites responsible for sorption. In the present application with Ni deposition as in Examples 1, 6 and 7, the size of the granules of support phase can have an additional impact on the performance, because the nickel is primarily deposited at the external surface of the support. Therefore the support particles prepared in the form of smaller granules are expected to provide a higher external surface area for the nickel deposition and result in enhanced performance. To assess the impact of particle size on sulfur removal performance of the pellets, we prepared samples of identical composition using different size of support granules. For these preparations, we used the same support phase, 20% wt. Mn-impregnated lanthanum-doped alumina screened and sized into 30-70 mesh (0.2 to 0.6 mm) granules, 1/16" (1.6 mm) pellets and 2.5 mm pellets.

Figure 10:
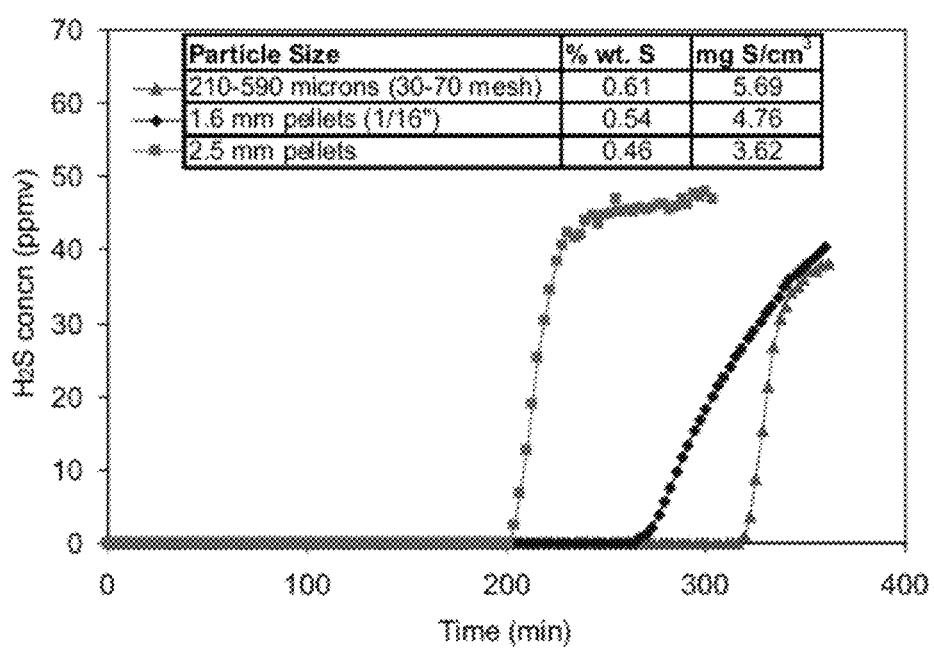
FIG. 10 is a graph illustrating the impact of particle size on sorbent (20% Mn 30% Ni/La—$Al_2O_3$) performance for reformate gas desulfurization. T=700° C., 50 ppmv $H_2S$, $H_2$=40% vol., $H_2O$=4.7% vol., balance $N_2$, GHSV=15,000 $h^{-1}$.

Prior to testing all samples were reduced at 700° C. using a 2% $H_2$/nitrogen mixture. We then evaluated all these samples using a simulated reformate gas to measure their sulfur capacity. The results are provided in FIG. 10. As expected, smaller size particle provided a much better sulfur breakthrough capacity most likely due to better nickel deposition on the higher external surface provided by the smaller granules and reduced diffusion limitation in the smaller pellets. The fact that the saturation sulfur capacity of 2.5 mm pellets is much lower than 1.6 mm pellets suggests that use of smaller size granules for the deposition provides better properties due to presenting a high external surface area for deposition, and the effect observed was greater than the gain that could be attributed to improved pore diffusion.

Example 9

Impact of Promoters

We evaluated the impact of various promoters to enhance the sulfur capacity of the sorbent, including molybdenum, manganese, ruthenium and zinc. We introduced the desired quantities of these promoters either by wet impregnation of the corresponding metal salts or by using the urea-based deposition method. In both approaches, we first introduced the promoter onto the La-stabilized $Al_2O_3$ support and then calcined the samples at 350° C. for 2 hrs. The 350° C. air treatment was sufficient to decompose the salt into its respective oxide and drive off any moisture to open up pores for subsequent nickel deposition. For all samples, we maintained an identical weight for each promoter to assess their impact on performance on an equivalent basis.

The selection of the promoters was due to their proven sulfur capacity in similar applications at low temperatures. Although none of the phases could alone reduce the sulfur concentration of the reformate gas to the low ppb levels desired for fuel cell systems at 700-800° C., they were evaluated to determine if they could provide a sink for sulfur and enhance the overall sulfur capacity of the sorbent.

Prior to testing all samples were reduced at 700° C. using a 2% $H_2$/nitrogen mixture. We then evaluated all these samples using a simulated reformate gas to measure their sulfur capacity. The results are provided in Table 5. The ruthenium-promoted sample showed better performance improvement compared to the Mo and Zn-promoted samples. The Mn-promoted sample also improved the sulfur capacity, while achieving the highest capacity on volume basis (sulfur capacity on volume basis is important to ensure that the desulfurizer will occupy a small space which is at premium in transportation systems).

TABLE 5

Impact of addition of promoters on sorbent (20%Ni/La—$Al_2O_3$) performance for reformate gas desulfurization.

| Sorbent | % wt. S | mg S/cm³ |
|---|---|---|
| 20% Ni/La—$Al_2O_3$ | 0.68 | 3.57 |
| 10% Mo 20% Ni/La—$Al_2O_3$ | 0.59 | 3.01 |
| 10% Mn 20% Ni/La—$Al_2O_3$ | 0.75 | 5.22 |
| 10% Ru 20% Ni/La—$Al_2O_3$ | 0.76 | 4.03 |
| 10% Zn 20% Ni/La—$Al_2O_3$ | 0.25 | 1.19 |

We also prepared palladium promoted samples to attempt to enhance the sulfur removal efficiency of the nickel sorbents. For the application of the palladium promoter, we used the sorbent, 20% wt. Ni on La-doped alumina. The addition of palladium is accomplished by wet impregnation using a palladium nitrate [$Pd(NO_3)_2$] precursor. We prepared formulations with 0.5%, 2% and 5% by weight and showed that all of the Pd-promoted samples improved sulfur removal efficiencies of the sorbent sample as shown in Table 6. These samples reduced the sulfur concentration of the reformate gas to well below 1 ppbv (below the detection range of our sulfur analyzer). Although the addition of Pd significantly increases the sorbent cost, these sorbents may be used for fuel cell systems that require the highest level of protection.

TABLE 6

Impact of palladium promoter on sorbent performance for reformate gas desulfurization.

| Sorbent | % wt. S | mg S/cm³ |
|---|---|---|
| 20% Ni/La—$Al_2O_3$ | 0.68 | 3.57 |
| 0.25% Pd 20% Ni/La—$Al_2O_3$ | 0.57 | 3.68 |
| 2% Pd 20% Ni/La—$Al_2O_3$ | 0.71 | 4.45 |
| 5% Pd 20% Ni/La—$Al_2O_3$ | 0.74 | 4.75 |

Example 10

Impact of Stabilizers

We evaluated the impact of various stabilizers to enhance the sulfur capacity of the sorbent, including magnesium and manganese. At the operating temperatures of interest, if the regeneration is carried out under air (or cathode off-gas that contains relatively high concentrations of oxygen), the metallic nickel is oxidized to nickel oxide. Although the nickel oxide phase can be converted back to metallic nickel phase using a small fraction of the anode off gas or clean reformate gas, under oxidizing conditions, the nickel oxide phase could react with the alumina and form a nickel aluminate phase that is not active for sulfur removal. Although the formation of the nickel aluminate phase is restricted mainly to the nickel-alumina boundary and even after formation of the nickel aluminate phase, there will still be a reasonable amount of free nickel to be used in subsequent cycles for sulfur removal, we investigated the use of various stabilizers for the support phase to minimize the nickel-alumina interaction during oxidative regeneration.

In nickel-based steam-methane reforming catalysts, the interaction between nickel and the support is prevented by preparing the active nickel phase on supports such as calcium or magnesium aluminate. Alkali groups strongly bind the alumina via a strong acid-base interaction, thus it is believed that alumina bonded with alkali groups will have a smaller tendency to react with the nickel and prevent the formation of the nickel aluminate phase that could lead to the loss of active nickel sites responsible for reforming reaction.

Among the various alkali or alkaline earth metals (e.g., Li, Na, Mg, Ca, Sr), we selected magnesium for evaluation to provide a magnesium aluminate barrier layer to prevent nickel-alumina interaction at higher temperatures under oxidative regeneration conditions. We also used a manganese oxide top layer for the same purpose providing a manganese aluminate support that should likewise prevent interactions between nickel and alumina. Both the magnesium and manganese preparations are prepared following an identical preparation procedure.

We introduced the desired quantities of these promoters by wet impregnation of the corresponding metal salts (e.g., magnesium nitrate and manganese nitrate) to La-stabilized alumina. Following the impregnation, the samples are calcined in air for 8 hr at 700° C. to form a magnesium aluminate or manganese aluminate top layer. These samples were then used in our standard deposition-preparation method to deposit the active nickel phase. The nickel deposition is repeated two times to achieve a Ni loading of 20% wt. with intermediate calcination steps carried out at 350° C. for 6 hours. We activated the samples in a clean reformate stream at 700° C. prior to use and evaluated them at 700° C. under representative conditions. The results are provided in Table 7. Both Mg- and Mn-stabilized samples showed improved performance over the base sorbent.

TABLE 7

Impact of addition of stabilizers on sorbent performance for reformate gas desulfurization.

| Sorbent | % wt. S | mg S/cm$^3$ |
|---|---|---|
| 20% Ni/La—Al$_2$O$_3$ | 0.68 | 3.57 |
| 10% Mg 20% Ni/La—Al$_2$O$_3$ | 0.72 | 5.36 |
| 10% Mn 20% Ni/La—Al$_2$O$_3$ | 0.75 | 5.22 |

In addition, we also evaluated the impact of manganese concentration on sorbent performance. We selected manganese because in addition to providing an unreactive top-layer, the manganese oxide can also work as an effective getter for the sulfur species (as shown in Example 9). In prior art, it has been shown that various manganese oxide phases, (e.g., MnO, Mn$_2$O$_3$, Mn$_3$O$_4$ can achieve high H$_2$S capacity in cleaning coal-derived synthesis gas at high temperatures, such systems being referred to as "hot gas clean-up systems" (Ben-Slimane 1994a, 1994b; Bakker 2003; Yoon 2003). Although none of these manganese oxide phases can alone achieve the low levels of sulfur required for the fuel cell applications, they might prove to be beneficial in combination with the active nickel phase.

Figure 11:
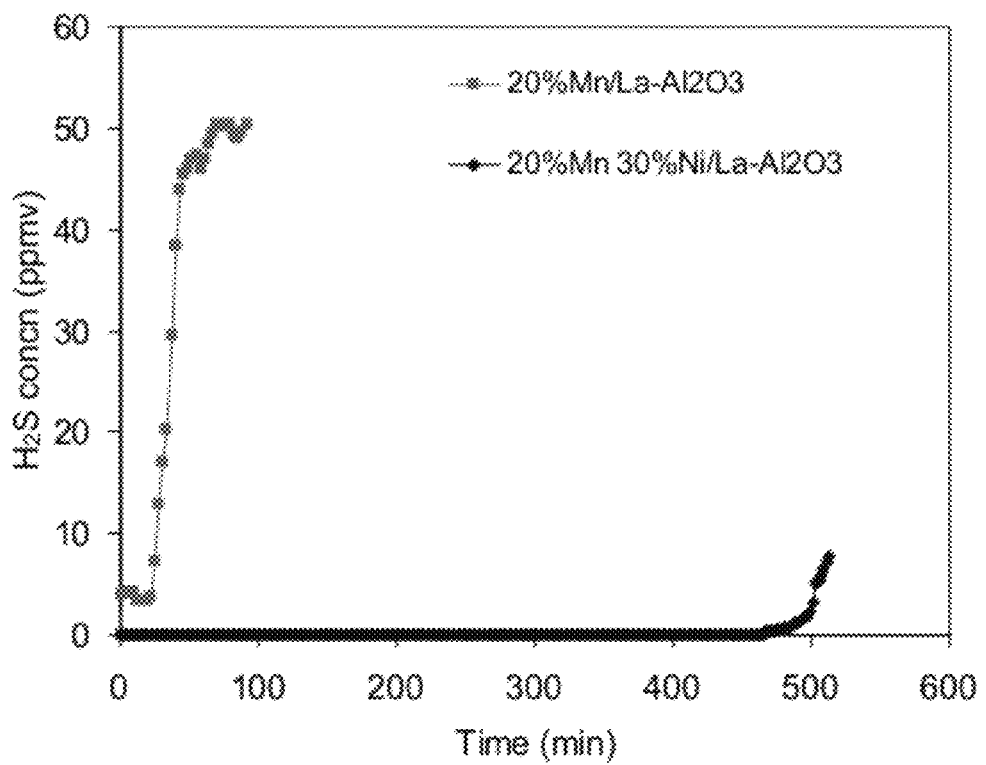
FIG. 11 is a graph comparing sorbent performance of Mn (only) containing (20% Mn/La—$Al_2O_3$) support and Ni—Mn containing sorbent (20% Mn 30% Ni/La—$Al_2O_3$) for reformate gas desulfurization. T=700° C., 50 ppmv $H_2S$, $H_2$=40% vol., $H_2O$=4.7% vol., balance $N_2$, GHSV=15,000 $h^{-1}$.

We prepared manganese stabilized samples containing different amounts of manganese. We tested these samples at 700° C. in simulated reformate gas stream containing 50 ppmv H$_2$S, 40% H$_2$, 4.7% H$_2$O in N$_2$. The results are provided in Table 8. 20% Mn 30% Ni/La—Al$_2$O$_3$ sorbent sample provided significantly higher sulfur loading on unit volume basis than other samples. We also prepared a sample containing 20% Mn on La—Al$_2$O$_3$ and tested it for reformate gas desulfurization. We found that the sample containing just Mn (with no Ni) had a poor sulfur loading of 0.06% wt. and as expected leaked about 3 ppmv H$_2$S (see FIG. 11) exhibiting a poor removal efficiency. This demonstrates that Ni is the primary sorbent for the removal H$_2$S from the reformate gas at high temperatures and Ni is responsible for removing sulfur to sub-ppmv levels needed for the fuel cell application.

TABLE 8

Impact of amount of manganese on sorbent performance for reformate gas desulfurization.

| Sorbent | % wt. S | mg S/cm$^3$ |
|---|---|---|
| 20% Ni/La—Al$_2$O$_3$ | 0.68 | 3.57 |
| 20% Mn/La—Al$_2$O$_3$ | 0.06 | 0.37 |
| 5% Mn 20% Ni/La—Al$_2$O$_3$ | 0.83 | 5.25 |
| 10% Mn 20% Ni/La—Al$_2$O$_3$ | 0.75 | 5.22 |
| 20% Mn 20% Ni/La—Al$_2$O$_3$ | 0.72 | 5.26 |
| 30% Ni/La—Al$_2$O$_3$ | 0.71 | 4.34 |
| 20% Mn 30% Ni/La—Al$_2$O$_3$ | 0.95 | 8.42 |

Example 11

Preparation and Evaluation on Monolith Supports

In addition to pellets or irregular shape granules, the sorbent can be prepared on any engineered structures such as honeycombs or monoliths following any standard monolith preparation procedure. Four such procedures are illustrated in this example.

(a) Ni Deposition on a Mn/La—Al$_2$O$_3$ Slurry Washcoated Cordierite Monolith

First, the 20% wt. Mn supported on La—Al$_2$O$_3$ powder (−70 mesh) was prepared by following the standard procedure described earlier i.e., by impregnation of La—Al$_2$O$_3$ powder with the Mn(NO$_3$)$_2$ solution and calcined at 700° C. for 9 hours. Once the reactive phase is prepared as a fine powder, we prepared mixed it with an alumohydrogel washcoat. The alumohydrogel was prepared by mixing 20 g of boehmite (Catapal A from SASOL North America) with lactic acid in the molar ratio of 6:1 and 200 mL H$_2$O. The mixture was stirred overnight at 60° C. to yield the alumo hydrogel. Then, a slurry of 20% Mn/La—Al$_2$O$_3$ (1 g) and alumohydrogel (2.5 g) was prepared in 5 mL H$_2$O; the slurry was applied multiple times to the corderite monolith (5.0 g) available by Corning to make the washcoat. In between the applications of the slurry, the cordierite monolith was dried at 120° C. Finally, it was calcined at 350° C. for 1 hr. Next, the Ni deposition was carried out on the monolith washcoated with the desired support phase at 95° C. following the procedure described earlier in Example 1 using a urea:Ni molar ratio of 20:1 and slurry washcoated monolith:urea wt. ratio of 1:2.2. We carried out multiple depositions with intermediate calcinations at 350° C. for 2 hours. At the end of 6$^{th}$ deposition we achieved 25% wt. NiO loading on the Mn/La—Al$_2$O$_3$ slurry washcoated cordierite monolith.

(b) Ni—Mn/La—Al$_2$O$_3$ Slurry Washcoated on a Cordierite Monolith

First, the 20% wt. Mn supported on La—Al$_2$O$_3$ powder (−70 mesh) was prepared by standard procedure described earlier i.e., by impregnation of La—Al$_2$O$_3$ powder by Mn(NO$_3$)$_2$ solution and calcined at 700° C. for 9 hours. Then the Ni deposition was carried out on the 20% Mn/La—Al$_2$O$_3$ powder at 95° C. following the procedure described earlier in Example 1 using a urea:Ni molar ratio of 20:1 and Mn—LaAl$_2$O$_3$ powder:urea wt. ratio of 1:2.2. We carried out multiple depositions with intermediate calcinations at 350° C. for 2 hours. At the end of 3$^{rd}$ deposition we achieved 30% Ni loading on the Mn/La—Al$_2$O$_3$ powder. Next, a slurry of 20% Mn 30% Ni/La—Al$_2$O$_3$ powder (2 g) and alumo-hydrogel (5 g) (preparation procedure for alumo hydrogel is described in Example 11(a)) was prepared in 15 mL H$_2$O and used to fill up the monolith multiple times. Between the applications of the slurry, the monolith was dried at 120° C. (to constant weight ~25% wt. gain). Finally, it was calcined at 350° C. for 1 hr.

(c) Ni Deposited on a CaO Impregnated Al$_2$O$_3$ Monolith: Al$_2$O$_3$ monolith was impregnated with Ca(NO$_3$)$_2$ solution (9.6 g Ca(NO$_3$)$_2$ in 6 mL H$_2$O) to achieve 20% wt. CaO loading on the monolith (8.3 g), dried, and calcined at 800° C. for 10 hr. Next, the Ni deposition was carried out on the monolith at 95° C. following the procedure described earlier in Example 1 using a urea:Ni molar ratio of 20:1 and slurry washcoated monolith:urea wt. ratio of 1:2.2. We carried out multiple depositions with intermediate calcinations at 350° C. for 2 hours. At the end of 4$^{th}$ deposition we achieved 13% NiO loading on the CaO impregnated Al$_2$O$_3$ monolith (provided by GeO2 Systems).

(d) Ni Deposited on a Cao Impregnated Cordierite Monolith:

Cordierite monolith was impregnated with $Ca(NO_3)_2$ solution (9.6 g $Ca(NO_3)_2$ in 6 mL $H_2O$) to achieve 20% wt. CaO loading on the monolith (8.3 g), dried, and calcined at 800° C. for 10 hr. Next, to deposit Ni, $Ni(OH)_2$ suspension was prepared by mixing $Ni(NO_3)_2.6H_2O$ (10 g) and aqueous ammonia (25 mL of 28-30 wt % solution). $Ni(OH)_2$ suspension (2 g) was used to impregnate the CaO impregnated cordierite monolith (4.8 g) and dried at 120° C. for 2 hours followed by calcination at 350° C. Next, the monolith was impregnated with the leftover suspension of $Ni(OH)_2$ and dried at 120° C. for 2 hours followed by calcination at 350° C. At the end of $2^{nd}$ impregnation and calcination we achieved 27% NiO loading on the CaO impregnated cordierite monolith.

Figure 12:
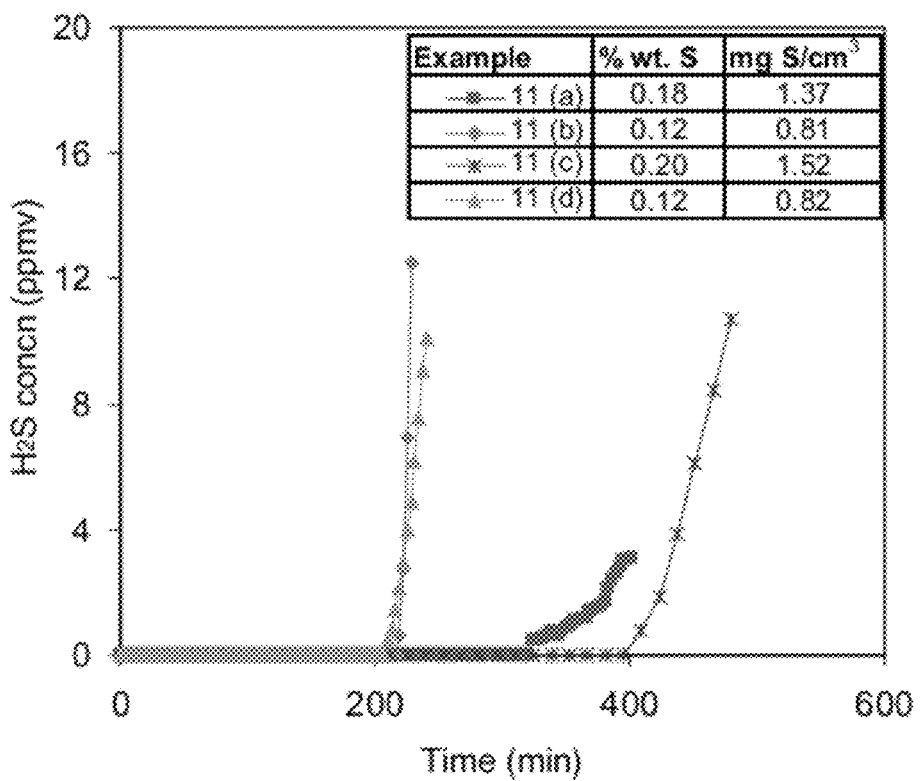
FIG. 12 is a graph showing performance of several monolith sorbents for reformate gas desulfurization. T=700° C., 50 ppmv $H_2S$, $H_2$=40% vol., $H_2O$=4.7% vol., balance $N_2$, GHSV=3,200 $h^{-1}$.

We tested these monolith samples as prepared in a custom made reactor at 700° C. in a simulated reformate gas stream containing 50 ppmv $H_2S$, 40% $H_2$, 4.7% $H_2O$ in $N_2$. The results are provided in FIG. 12.

The foregoing examples are illustrative and are in no way intended to limit the scope of the invention.

We claim:

1. A method for removing sulfur from a high temperature gas stream containing sulfur which comprises the step of contacting the gas stream with a sorbent comprising a nickel phase dispersed on a particulate or monolith support, wherein the high temperature gas is at a temperature above 500° C., wherein the support is selected from a rare-earth-doped metal oxide selected from titania, zirconia or alumina and wherein the rare-earth metals include scandium, yttrium and the lanthanoid metals.

2. The method of claim 1 wherein the high temperature gas stream is at a temperature ranging from 700 to 800° C.

3. The method of claim 1 wherein the high temperature gas stream is a reformate gas.

4. The method of claim 1 wherein the sulfur level of the gas stream is reduced to ppbv levels at a temperature ranging from 700 to 800° C.

5. The method of claim 1 wherein the support is a particulate support having surface area greater than 100 $m^2$/g.

6. The method of claim 1 wherein the sorbent further comprises manganese, magnesium or a combination thereof deposited on the support.

7. The method of claim 1 wherein the sorbent further comprises a manganese phase.

8. The method of claim 1 where the support is γ-alumina.

9. The method of claim 1 wherein the nickel phase is deposited on the support in the form of nanoparticles.

10. The method of claim 1 wherein the support is doped with scandium, yttrium or lanthanum.

11. The method of claim 1 wherein the particulate sorbent is applied to or coated on a monolith support.

12. The method of claim 1 wherein the sorbent comprises a nickel phase dispersed on a monolith support, or a monolith support having a particulate metal oxide support applied thereto.

13. The method of claim 1 wherein the sorbent further comprises one or more alkali metals, alkaline earth metals, manganese, ruthenium or palladium which are impregnated into or deposited upon the support.

14. A method for removing sulfur from a high temperature gas stream containing sulfur which comprises the step of contacting the gas stream with a sorbent, wherein the high temperature gas is at a temperature above 500° C. and wherein the sorbent comprises a nickel phase and a manganese phase deposited on a particulate support.

15. The method of claim 14 wherein the particulate support is γ-alumina or La-doped γ-alumina.

16. A method for removing sulfur from a high temperature gas stream containing sulfur which comprises the step of contacting the gas stream with a sorbent comprising a nickel phase dispersed on a particulate or monolith support, wherein the high temperature gas is at a temperature above 500° C. and wherein the nickel phase is deposited on the support by a process that comprises a step of deposition of nickel from an aqueous solution of a nickel compound or salt by changing the pH of the solution from below pH 6 to above pH 6, by thermal decomposition of urea or an ammonium compound.

17. The method of claim 16 wherein the pH is changed by thermal decomposition of urea at temperatures ranging from 80 to 95° C. at ambient pressure, wherein the molar ratio of urea to nickel in the deposition solution ranges from 5:1 to 20:1.

18. The method of claim 16 wherein the pH is changed by thermal decomposition of ammonium compounds, including but not limited to ammonium carbonate and aqueous ammonia, at temperatures ranging from 80 to 95° C. at ambient pressure, wherein the molar ratio of ammonium compound to nickel in the deposition solution ranges from 5:1 to 20:1.

19. The method of claim 16 wherein the pH of the solution is changed from below pH 6 to above pH 6 in a time period that ranges from 30 minutes to 10 hours.

20. A method for removing sulfur from a high temperature gas stream containing sulfur which comprises the step of contacting the gas stream with a sorbent comprising a nickel phase dispersed on a support, wherein the high temperature gas is at a temperature above 500° C. and wherein the sorbent comprises a nickel phase dispersed on La-doped γalumina which is optionally applied to a monolith support.

21. The method of claim 20 wherein the sorbent is La-doped γ-alumina with a nickel phase and a manganese phase dispersed thereon which is optionally applied to a monolith support.

22. A system for removal of sulfur from a gas stream at a temperature above 500° C. which comprises one or more sorbent elements wherein the sorbent comprises a nickel phase dispersed on a particulate or monolith support and the support is selected from a rare-earth-doped metal oxide selected from titania, zirconia or alumina.

23. The system of claim 22 for providing a desulfurization reformate gas to a fuel cell which further comprises:
a source of reformate gas containing sulfur; and
at least one conduit for providing desulfurized reformate to a fuel cell.

24. The system of claim 23 further comprising:
a reformer for generating the sulfur-containing reformate gas and a
a fuel cell for receiving the desulfurized reformate.

25. The system of claim 24 wherein the fuel cell is a high temperature fuel cell.

26. The system of claim 24 wherein the fuel cell is a solid oxide fuel cell or a molten carbonate fuel cell.

27. The system of claim 24 further comprising one or more conduits for providing regeneration gas to one or more sorbent elements in need of regeneration.

28. The system of claim 27 wherein the one or more conduits for providing regeneration gas use anode tail gas from the fuel cell to regenerate the one or more sorbent elements in need of regeneration.

29. The system of claim 27 wherein the one or more conduits for providing regeneration gas use an oxidized gas selected from air or cathode tail gas from the fuel cell to regenerate the one or more sorbent elements in need of regeneration.

30. The system of claim 29 wherein the one or more sorbent elements are reactivated after regeneration using a sulfur clean reducing gas selected from anode tail gas from the fuel cell or clean reformate gas.

31. A system for removal of sulfur from a gas stream at a temperature of above 500° C. which comprises one or more sorbent elements comprising a sorbent, wherein the sorbent comprises a nickel phase dispersed on La-doped γ-alumina.

32. The system of claim 31 wherein the sorbent is La-doped γ-alumina with a nickel phase and a manganese phase dispersed thereon.

33. The system of claim 31 wherein the sorbent is La-doped γ-alumina with a nickel phase and a manganese phase prepared on a monolith support.

\* \* \* \* \*